US006273673B1

United States Patent
Wootten

(10) Patent No.: US 6,273,673 B1
(45) Date of Patent: Aug. 14, 2001

(54) BALL TURBINE

(76) Inventor: William A. Wootten, P.O. Box 62466, Boulder City, NV (US) 89006

( * ) Notice: Subject to any disclaimer, the term of this patent is extended or adjusted under 35 U.S.C. 154(b) by 0 days.

(21) Appl. No.: 09/263,832

(22) Filed: Mar. 8, 1999

Related U.S. Application Data

(63) Continuation-in-part of application No. 08/977,738, filed on Nov. 25, 1997, now Pat. No. 5,885,057.

(51) Int. Cl.$^7$ .................................. F01D 5/00; C21B 5/00
(52) U.S. Cl. .................................................. 415/73; 74/459
(58) Field of Search .................................. 415/72, 73, 75; 74/459, 424.8 R

(56) References Cited

U.S. PATENT DOCUMENTS

| | | | |
|---|---|---|---|
| 2,890,594 | 6/1959 | Galonska | 74/459 X |
| 3,053,105 | 9/1962 | Cole | 74/459 X |
| 3,242,817 | 3/1966 | Stoeckicht | 74/459 X |
| 3,807,243 | 4/1974 | Yada | 74/459 X |
| 4,211,125 | * 7/1980 | Benton | 74/424.8 R |
| 4,738,415 | 4/1988 | Weyer | 74/424.8 R |
| 4,770,606 | 9/1988 | Kuroiwa | 415/73 X |
| 5,168,767 | 12/1992 | Morita | 74/424.8 R |

* cited by examiner

Primary Examiner—John E. Ryznic

(74) Attorney, Agent, or Firm—Connolly Bove Lodge & Hutz

(57) ABSTRACT

A turbine method and apparatus having a stator and rotor mounted for rotation relative to the stator. The stator has at least one groove facing the rotor and the rotor has at least one groove facing the stator, the direction of each rotor groove intersecting the direction of a corresponding one of the stator grooves to form a round channel for retention of a ball driven by intermittently inserted propelling fluid as the closely fitted lands of the stator and rotor partially seal the space holding the ball as it rolls along this channel between a presssure inlet and outlet thereof. A return passage returns the ball from the channel outlet to the channel inlet in response to a portion of the propelling fluid or a mechanical moving element. The stator groove may be straight or curved and the rotor groove straight or both the stator and rotor grooves may be curved at different angles. Optionally, a torus ring having left or right hand helical grooves may be enclosed in a like grooved stator body with opposed left and right hand helical grooving. The stator is fitted to the outside of the torus ring. The cylindrical rotor has a grooved concave surface fitted to the inside of the torus ring. The rotor groove direction can be common with the rotor axis or turn around a left or right hand spiral. The grooved intersections of the rotor, the torus ring and the stator provide channels for accommodating a plurality of propelled balls driven in continuous circuits forming helical paths around the torus ring. A disc encircling and fixed to the torus ring has a plurality of apertures cooperating with a like plurality of ports in the stator to provide valving to first supply fluid pressure to propel the balls and then to exhaust the same.

16 Claims, 10 Drawing Sheets

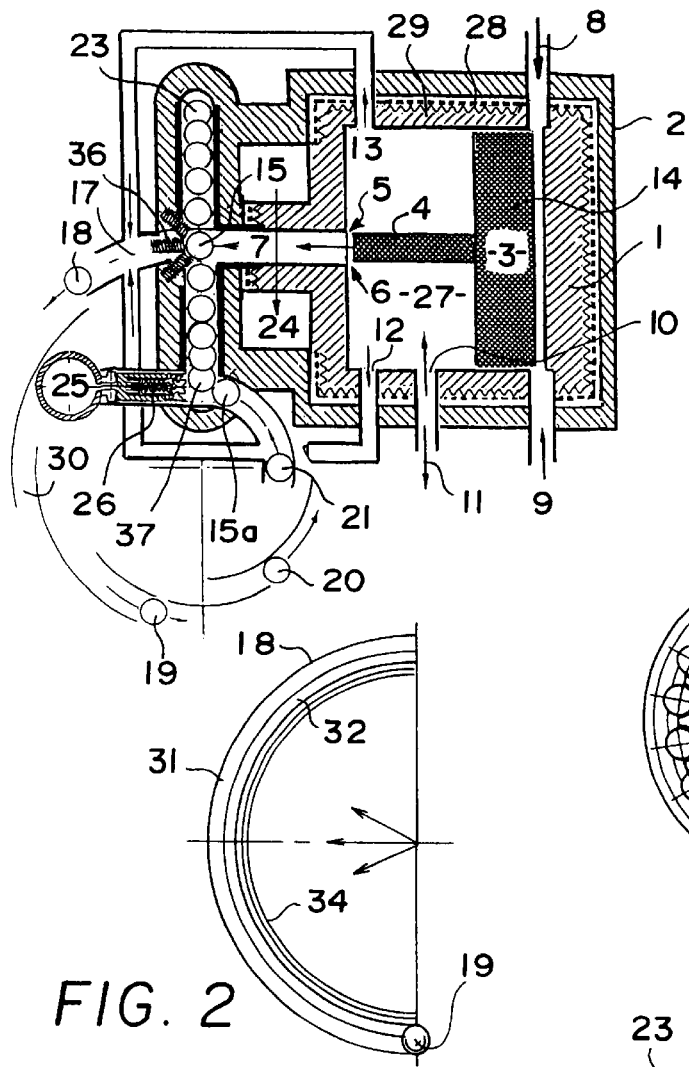
FIG. 1
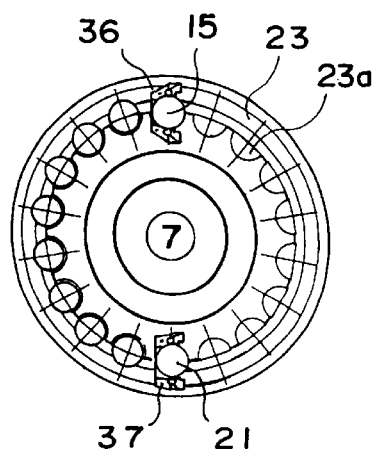
FIG. 4
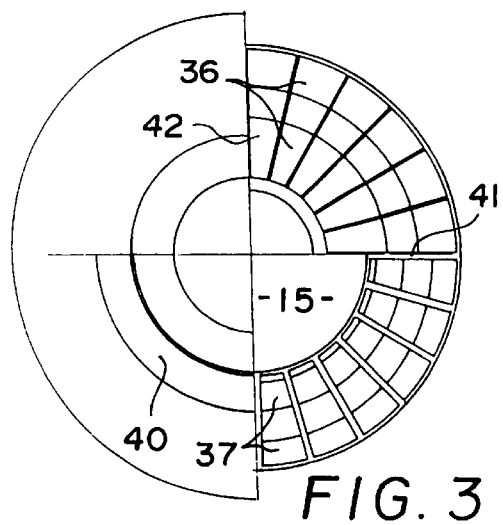
FIG. 2
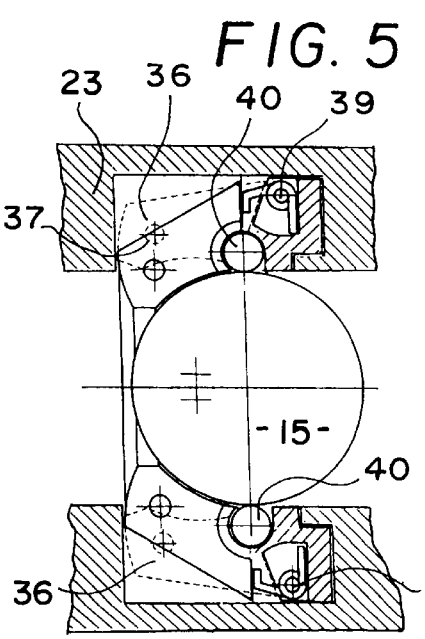
FIG. 5
FIG. 3

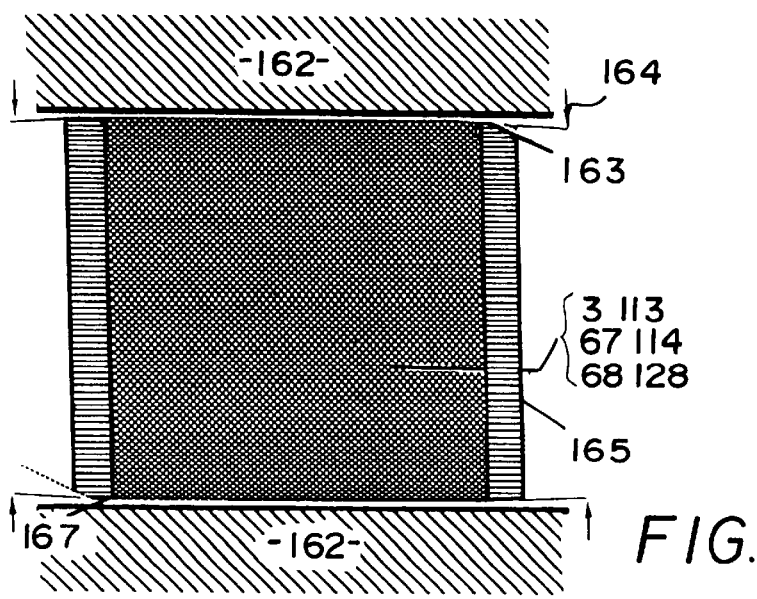
FIG. 19
FIG. 20
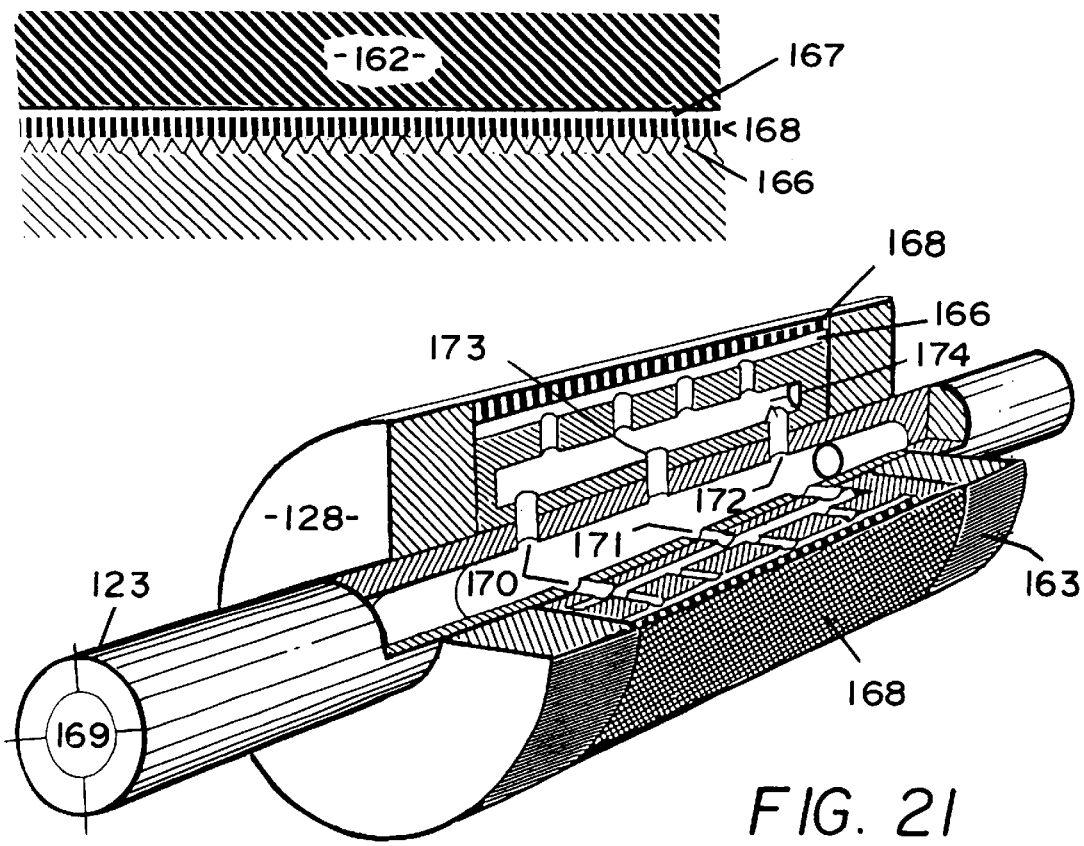
FIG. 21

BALL TURBINE

RELATED APPLICATIONS

This is a Continuation-in-Part of application Ser. No. 08/977,738, filed Nov. 25, 1997, now U.S. Pat. No. 5,885,057 and its entire contents are incorporated herein by reference.

BACKGROUND OF THE INVENTION

Reciprocating apparatus in the form of positive displacement compressors or engines in which pistons move in cylinders are all worked in conditions of high friction between moving adjoined surfaces that require lubrication applied in environments of considerable heat. When used for the movement or compression of some gases, the oxidation of the lubrication is objectionable and contributes to the friction condition and the normal heat escalation of compression. This friction adds to the requirement for cooling the gas product that is compressed and to also increase the cooling requirement of the engine or compressor block itself.

In an opposite sense the fan-like turbine structures that employ blades and impellers moving in close proximity to a surrounding stator have no friction factor but are not positive in displacement and are operated at extremely high speeds to overcome the slip-bypass in the space between blade tips and the stator vanes. This usually involves the addition to the turbine shaft of an elaborate and precision gear train reduction system to bring speeds down to usable operational levels.

In many of the gas and pumping and refinery situations, line drive dependence is upon combustion engines as the prime movers for the pumping apparatus used. These waste as much as 75% of the energy input in expended heat energy that goes up the exhaust stack. Electrical prime movers are more efficient, but there is always a potential for a spark-generated explosion and, in the refinery atmospheres, corrosion problems, as well as explosion proofing, make these electrical drives high in capital cost and costly to maintain.

In each existing instance, there is a great heat loss in the compressor itself as well as the heat loss in the driving engines or motors, so efficiency is frequently as low as 40 percent. Much of the heat generated in compression is transferred to the gases being compressed, leading to substantial work and cost involved in ancillary cooling equipment required to bring down the temperature of the compressed product gas. An example is Natural Gas that, when recompressed for delivery in a pipeline, must be cooled to about 100 degrees F. before it can be put back in the line and the gas used in refinery processes, that require compression where heat input is critical, also require elaborate cooling means before return to the process.

The equipment associated with this invention involves less in capital investment because it is smaller and more simple in design and therefore it is more easy to maintain.

In refinery practice there is a requirement for the high pressure compression of hydrogen. When this is done with conventional compression techniques each of several compression steps must be followed by high output cooling apparatus that has a significant energy input and is again highly capital intensive.

SUMMARY OF THE INVENTION

The Nucleate Steam Bubble as a Bearing

This is a wet steam by-product normally associated with boiler tubes, but is also visible as the first indication of boiling in a tea kettle. This bubble can be generated in any boiler water or created from the water associated with gas combustion exhaust. It can also function as a lubricant for moving parts while exhibiting considerable pressure if confined in a small space. The nucleate bubble thus generated serves as supporting means between pistons and cylinders of a pump, compressor, engine or ball turbine rotor, and even for support of fully enclosed sealed rotating cylindrical forms that can turn on these bubbles without bearings or seals in a fully closed and sealed chamber.

Nucleate Bubble Propagation

Nucleate steam bubbles can be generated with the existence of any scratch of indentation on a metal surface, but a perforation or slit with steam driven through such an opening provides a more perfect formation. Bubbles occur around a perforated piston's outer surface and expand into the laminar space between the piston and cylinder to escape at the ends with a contribution to the propulsion force driving the piston. This propulsion happens when pressure is applied at the trailing end to help drive the piston. The steam or gas combustion pressure moves into large openings at one end of a shell/like piston and along wall porting and manifolds to exit from small diameter slits or perforations around the piston's surface. The steam escapes from these to form nucleate bubbles at each hole opening on the piston's surface. Each bubble exhibits very high pressure as the steam explosively expands in this finite dual temperature space between the cylinder wall and the piston's surface. If the piston's driving pressure is distributed efficiently inside the piston, and the bubble perforation orifice areas total less than the input area to the piston interior, this propulsion effect can be achieved successfully. The escape space area between the piston end and the cylinder wall would normally be the circumference of the piston multiplied by a few thousandths of an inch with the consequence that the velocity of steam escape expelled from the rear of the piston, as it moves forward, would normally be increased 25 to 50 times and provide this contribution to driving propulsion. The tendency is for the steam inside the laminar space to be drawn to the trailing end of the piston by the shear between the opposed moving surfaces of the piston and cylinder walls. This tends to minimize escape from the front end of the piston as it works against the compressible product. The compression driving pressure further inhibits nucleate bubble steam escape from the working piston end. This can be further reduced with mechanical means employing an expanding bellows configuration at the front end of the piston actuated by the driving pressure. This can reduce the laminar space between piston and cylinder at one end to as finite a dimension perhaps as little as one thousandths of an inch, thus limiting nucleate bubble steam escape in this one direction, while still maintaining a mechanical clearance.

Placing a slight taper of 5 to 8 degrees off the axis of the piston end and extending approximately ¼" for each two inches of piston diameter provides a nozzle-like expansion area between the piston and the cylinder wall to help in controlling the expansion of this explosive high pressure bubble mass.

This bubble form also provides a pressure seal interfacing the compressed product and provides suspension for the piston as the bubbles expand explosively in the laminar space between the piston surface and cylinder wall. The bubbles, unlike other lubrication means, add a minute amount of water to the compressed product that can be ignored, or easily removed. There is no contamination from the oxidation of lubricants.

This nucleate bubble injection is not limited to the piston, for it can be used as a substitute for bearings as in the Rotating Valving Cylinder Wall, or like the piston, on the outer surface of the valve itself. Perforations are placed at the cylinder ends as well as around the periphery for this free running cylinder suspension that is accomplished without bearing or seals. In a like manner, nucleate bubbles are used for axial bearing support of the torus ring and rotor in the Toroidal Turbine of this invention.

Unlike conventional compression apparatus, the turbines of this invention employ Balls as a form of piston, as well as the Perforated Piston, in the reciprocating apparatus described in the method of this invention. When balls are used in this manner the Nucleate Bubble is generated with uniform scratching in the ball pathway or introduction through slits. A different pathway spacing gives room for the explosive bubble expansion providing support for the balls forcing them to roll against a portion of the enclosing surface as they are held away from the surfaces opposing their rotation.

Ball Projectiles Employed as Pistons

Balls used for this purpose are handled in a way that permits rolling rather than sliding in curving cylindrical-like conduits of special geometry.

For lightness these balls can be made with a Titanium metal.

To work in substitution for a piston, a ball must fit a cylindrical path just as a piston does but, unlike a piston, it is desirable for the ball to roll along this path which it doesn't do well because of the friction on one side. This grows out of the fact that it can only roll efficiently on something less than one-half of the path circumference. The ball rolling motion conflicts with the opposite half side of the cylindrical conduit so space must be provided for this clearance.

The Projectile Ball Conduit

Ball conduits as paths for the movement of the balls of this invention, can be long curving tubular enclosures to create long strokes that can far exceed that of a normal cylinder which has practical length limits. These conduits are provided with a difference in circumferential area between the two half sections as seen in a cross-sectional view. Inside these two dimensions the balls can roll along the closely fitted circumference portion easily because of a slight clearance between the ball's diameter and the larger opposite half surface circumference. This clearance eliminates the friction between the opposing rotation of the ball respecting that half surface. To augment this, a nucleate bubble generating slit is at a mid-point of this larger circumference in the conduit wall and here a line of bubbles are generated and swept up by the speeding ball to accumulate and be driven into the space between the ball's surface diameter and the larger circumferential area. In this way the bubbles provide support as small pressurized spheres in themselves in a type of "rolling" contact not unlike a number of ball bearings rolling between the ball line contact and the conduit wall. Thus the shear between the ball and tube wall cause them to turn under the ball projectile in a proper rotational direction with minimum friction occurring as the ball is driven by the pressure applied behind it.

As employed in the Engine/Compressor or the Toroidal Ball Turbine, the projectile ball conduit has a like geometry that facilitates nucleate bubble generation with use of the linear slit fed by a small long tube-like manifold that runs parallel to the ball transporting conduit. The slit provides a propagation line for the generation of bubbles in a manner not unlike the perforations.

The Toroidal Turbine apparatus of this invention is radically different from the Engine Compressor form described above, but does employ the projectile ball, the conduit and in some instances a latching or sprag-like ball reversal block means. In the preferred form of this invention a disc shutter-like means provides an intermittently applied pressure barrier behind the ball so the insertion of pressure provides a positive driving force against the ball surface.

The Engine/Compressor

In this form of apparatus of this invention, the Ball Projectiles and Pistons are used in combination wherein either one can be used before the other depending upon the requirements of the application respecting pressure and volume differences.

In the form described in the following Engine Compressor design, natural gas combustion is the driving force that propels the projectile balls successively with pressure pulses so each compresses the hot exhaust gases that has driven the prior ball passage through the conduit and into a pressure receiver from which it is valved to a space between pistons that, as they are driven away from their center position, perform the work of compressing the product steam or gas in the cylinder space at their opposite ends.

The purpose is to use this hot exhaust gas heat rather than sending it up the stack and to create an expansion of the gas for the pistons' driving force so the expansion creates an endothermic condition to cool the compression function rather than add heat to the compressed product as is normally done in the conventional compressor.

It is desirable to contain the entire mechanism in as compact an apparatus as possible to achieve the maximum thermodynamic control and effectively utilize the endothermic feature described above. For this reason an unusual valving system is employed.

Revolving Valving Cylinder

The cylinder of this invention is a normal piston enclosure, but also serves as the entire valving means and has peripheral porting that provides for the handling of all gas input and product output for the work done. The rotating alignment of ports in the apparatus greatly simplifies the synchronized valving functions required. The stepping rotation of the cylinder has no effect on the sliding movement of the pistons that it holds inside. This revolving cylinder is axially mounted on nucleate bubble "bearing" means as noted earlier and end perforations expel bubbles providing an "end position centering". This permits full sealing inside a stator body except for the bubble exhaust orifices so the stator can surround and enclose the cylinder entirely. The compressed product passes through ports that are timed to open intermittently to static piping in the stator for delivery to a receiver. The cylinder turns in proper timing with other events with synchronization of these accomplished by its geneva ball stepping drive.

Geneva-like Stepping Gear Ball Carrier

This Geneva Gear is so-called because it provides an intermittent stepping function as it holds a plurality of ball sockets or latching devices mounted around its periphery. These in turn hold the projectile balls and serve in their ejection into the conduit path ahead of gas pressure and the driving pulse. A latch in this gearlike element catches the ball at the end of its conduit excursion and grips it securely until the impact of a recovered ball overcomes this clamp and drives a new ball into the pressure stream. The force of pressure ahead of the ball as it is completing its conduit excursion and its impact in the recovery latch moves the Geneva Gear one step and, because it is an integral part of the Rotating Valving Cylinder, this too moves one rotational step with this action which is the prime synchronizing function of the apparatus as each step aligns different ports of varied size for release, transfer and admission of gases to the several functions in the apparatus.

The movement of the ball in the first stage compression function delivers the ball accumulated and compressed hot exhaust gas between pistons in the Rotating Cylinder described which causes them to move apart with the hot gas expansion to compress a product gas at the opposite ends of the pistons in the cylinder. The movement of the Projectile Balls and the Geneva Gear assembly in turn rotates the Rotating Cylinder performing all the functions required for the drive and compression of product gas.

The Natural Gas Combustion or Steam Driven Tower Compressor

The Tower Compressor comprises a tall cylinder and a single piston that is driven upward in a long stroke by natural gas combustion or steam expansion. Normally these would be used in a group of units synchronized to function together. The cylinder is wrapped with a steam coil of a larger diameter than that of another smaller tube coil that wraps the hot exhaust pipe carrying off the exhaust gases from Natural Gas combustion. When Natural Gas is used for the drive, this exhaust and the associated small diameter coil provide for preheating of the exhaust steam delivered from a turbine. This exhaust pipe's temperature is about 1,500 degrees F. and adds heat to the steam. With delivery of this heated exhaust steam to the larger diameter coil on the cylinder there is expansion in this tube which creates an endothermic condition for control of the compression cylinder temperature. Conversely the compressed steam can be passed through the coil of the gas combustion exhaust pipe heat exchanger coil for the addition of heat to the steam before return to the turbine. The piston used is the nucleate bubble perforated form, is free and does not require lubrication.

A plurality of the Tower Compressors can draw in very low pressure steam in sufficient volume to provide a vacuum draw for a conventional turbine and provide high pressure and temperature steam for reinjection to the turbine.

Injecting this steam compression function into the cycle of a power plant is not unlike the use of a compressor in the aircraft fan-jet engine cycle in that it adds a stage to boot-strap steam production before the phase change to water.

Compression of steam is made possible because of the unusual use of a free piston and the nucleate bubble support that eliminates most friction and the need for lubrication. The pistons of this invention are not used with piston rod connections so there is no possibility of a water condition causing a crash.

If low pressure/temperature steam were available as generated in a solar energy system it could be employed as the make-up steam requirement for steam compression using a gas combustion compression system of this type. In a more intensive effort a saturated steam solar plant could provide the start-up steam pressure for high pressure compression production in a medium sized turbine/electrical system. The turbine designs of this invention are the only practical form suited to Solar Steam and its low temperature and low pressure.

The Axial Toroidal Ball Turbine

Here a large number of balls move continuously in a single direction around a common toroidal path comprising a plurality of helical loops, arranged so a part of each loop's path crosses longitudinally the entire outside diameter of a rotor and the entire inside diameter of a stator in the adjoinment of this Stator/Rotor assembly between which adjoined surface half-round grooves enclose balls between the grooves. In this pathway the balls move along the half-round grooves in the bore of the fixed stator effectively making a key-like connection of the ball between this groove and that of the half-round rotor groove. The grooves inscribe a series of spiral segments or helical pathways around the length of the outside diameter of the rotor shaft. These extend from one end to the other. The half-round grooves between the two provide a full round opening at only one point in their adjoined lengths between the stator and the rotor. This intersection occurrence allows a single ball to enter as the opening occurs in rotational alignment as the rotor turns and then is retained as it moves through the length of the adjoining fit between the rotor shaft and stator bore. Each groove of the rotor can optionally trace a spiral around the rotor periphery with a "lead" consisting of one turn for the rotor length or a segment of spiral around the circumferential length of the rotor. In the preferred form of this invention the segments should not make more than one full 360° turn around the rotor or inside the stator. The angular relationship between the opposing left-hand and right-hand grooves at the intersection of the two determines torque or turning force the rotor develops as created by the pressure applied against the area of the balls as they roll in the grooved pathway between the fixed stator and the movable rotor, or conversely if the shaft is driven to turn the rotor's grooved circumference and the ball areas are driven against a compressible condition. The grooves inside the stator bore can curve in an opposite direction as described, or simply be straight as opposed to the angled grooves of the rotor. The angle of attack against the balls as applied by the grooves can be varied from as little as 10 degrees to opposing 45-degree grooves. As all of a plurality of balls enter all of the aligned openings at the stator/rotor end with pressure applied behind them, the total force applied is the sum of all of the balls' diameter area and they function like a plurality of pistons. As the balls move along the rigid stator path held in the half-round pathways of the rotor, a matching full round opening traps the ball causing it to remain aligned while it moves in rolling contact at this one point of full round opening between the opposing moving surfaces. A plurality of balls, one introduced from each helical loop, can thus enter a plurality of aligned openings at one end of the stator/rotor at the same time and, after entry pressure, can be continuously delivered into and along the half-round space to drive the ball along the groove to turn the rotor with the total force of all the balls applied. Exhaust outlet openings for the driving pressure are at the end opposite the ball entrance where the rotor grooves terminate. They can be in the rotor or the stator. The balls exit through a full round opening in the stator to start the return path to the starting point. In the preferred form of this invention the half-round grooves in the rotor and the stator exhibit the same geometry as that associated with the ball conduit of other apparatus described earlier, in which there is a dimensional difference between the two halves so a bubble generating slit or other means can be provided along the center of the larger which can optionally be the grooves of the stator or the rotor. This facilitates ball rotation and minimizes friction created by the ball rolling speed variation. In the preferred form of this invention there would normally be twice as many half-round openings provided in the rotor as in the stator to afford a fast loading of a new ball series for the transit along the length of the two parts. The fit between the rotor's outside diameter and the stator's inside diameter require critically ground surfaces similar to that of hydraulic motor and pump interfacing metal surfaces, because these two faces do in fact require a a near liquid-tight slip fit, and both diameters must meet a T.I.R. or total indicated runout criteria suited to maintain the seal of the lands surrounding the half-round opening interaction and contact during rotation so pressure can be effectively held.

An option in the solution to this critical fit is the introduction to the lands of either the stator or the rotor of the perforated surfaces and internal manifold means for injecting nucleate steam bubbles into this laminar space as a sealing means between the lands of the rotor and the stator.

What has been described in this apparatus form of this invention can have an alternative in a rotor that can be stationary or a stator that can be made the turning component.

Spiral groove segments can be used in the stator with straight groove segments in the rotor, or spiral grooves turning oppositely can be used in both.

Grooves could actually exhibit the same angle but with a greater angle intersecting with a lesser angle.

The groove spacing around the rotor or stator can be considered as divisional segments of 360 degrees. With 36 segments in a large rotor, for example, each groove would constitute a segment of 10-degree division. The segment division number and this degree spacing will determine the rotor length to accommodate one complete revolution of each groove of one segment if this were a requirement, however a grooved segment does not necessarily require one complete rotation and can represent only a portion of one full turn.

The ball return can be dependent upon gravity, or a planetary gear system can be employed to a plurality of alternately static and rotation annular shell members enclosing the shaft rotor so grooved segments in these can drive the balls along a return path providing a unit that can operate independently.

The ball return can also be accomplished by directing the exhaust pressure through the grooved return pathway as a means to power this return transit.

Method and Apparatus Forming this Invention

In all present day reciprocating engine and pump apparatus, there are the problems of generated heat as discussed earlier which must be controlled with heat exchange methods and lubrication. Other than the heat of gas combustion, a major heat source is caused by the friction between moving parts. When high pressures and temperatures are attempted in compressors, the lubrication of these hot surfaces becomes virtually impossible and, even with intense circulation of high temperature resistant oils and larger coolers pulling the temperature down before recirculation, such attempts have usually failed. Using a cooling oil for this purpose is very difficult and costly to accomplish. Even when all this is done efficiently, there is a gradual tendency to carbonize and leave deposits on pistons and cylinder liners that are troublesome.

There are rigid limits on temperatures allowable in such equipment.

In summation, in contrast to the conventional reciprocating engine and pump forms, this invention makes use of the nucleate bubble procedure in which there is minimum friction and little or no requirement for lubrication. The pistons and rotary parts work with a laminar layer of explosive high pressure nucleate bubbles forming and confined in this finite space between the moving part surfaces, and these are delivered into the space through small perforated openings or slits in adjoining surfaces. This method provides for friction and lubrication-free support of moving parts as outlined in the foregoing Summary of the Invention and in my co-pending U.S. patent application Ser. No. 08/653,967.

There is also described in this earlier work use of piston assemblies in which a plurality of piston and ram parts are arranged in annular positions of rams or pistons within pistons in complex forms that would be so heat-productive in normal applications as to be totally impractical. Here the friction and lubrication-free means make such piston assemblies possible in the production of very high pressures and temperature.

This type of compression can be applied in an electrical power plant with a change of energy from that of a boiler to a gas combustion-driven compressor or even a high pressure steam-driven compressor for the creation of high heat and high pressure steam with use of the spent steam from a turbine drive. When the spent steam leaves the turbine as a vapor, it is exhibiting a low vacuum condition of 2 to 3 inches of mercury and a temperature of about 200 degrees F. The steam has nearly completed the phase change to water and normally is run through cooling condenser units to bring it down to water after which it must be reheated and pressure injected into the boilers. This vacuum condition occurs because of the water falling in a column below the condenser. This is eliminated in the compression procedure of this invention, and the steam take-off from the turbine would require a 1 pound pressure rather than a vacuum condition. It would also require and logically have a slightly higher temperature.

There are a great variety of apparatus applications for this method of piston and ball projectile or piston support in cylinders as used for the transfer of energy.

The four methods cited and illustrated here each have a series of possible apparatus forms, but only one is described for each of the four applications mentioned in the foregoing Summary of the Invention.

A great advantage of the Ball Turbines and the application of the Nucleate Bubble bearing support is the use of wet steam at low pressures and temperatures. This eliminates the need for the super-heated steam, an absolute requirement for normal fan turbines entailing capital investment in massive boilers and condenser systems. Here low temperature steam can be used efficiently and returned directly to the boiler as water.

The Engine Compressor

While essentially the same, there are two forms of this apparatus, one in which the ball function occurs before input to pistons and the second in which the piston function precedes the ball compression. One relates to the pumping of natural gas along pipelines.

The other would apply in refinery service.

Both of these make use of the combination ball and piston apparatus described as the Engine Compression, but with an opposite geometry in which one has the ball phase before the piston and the other the piston phase before the ball. In the latter a higher pressure is achieved and in the former lower pressure and high volume.

In the low pressure Engine/Compressor of this invention as illustrated and described, the hot exhaust gas from the first ball drive stage is not exhausted until after it has been expanded between pistons in an endothermic action that reduces the heat applied to the pistons and therefore does not add heat as would be the case in a normal compression function. When this very hot gas is finally exhausted, its heat has been reduced to approximately 500 degrees F. or less. This is a great advantage over existing compression apparatus.

In the Engine/Compressor unit when the driving force is natural gas combustion, the low temperature water vapor or low pressure steam can be preheated and partially pressurized by passing it through the center of the gas combustion chamber that momentarily has temperatures as high as 1,200° F. The combustion chamber's temperature can be controlled in this manner and some of this high heat imparted to the steam prior to compression.

The ball and piston technique of this invention provides the means to magnify greatly the compression effect with use of large piston diameters and short strokes as the propelling means for proportionately smaller diameter balls functioning as piston-like projectiles driven through a long compression path, that is effectively a long stroke, with great speed and force to compress the residual exhaust gases ahead, as captured between the ball excursions. This is an opposite configuration to that described above.

If the propelling media is exhaust gas from a natural gas explosion, it can, for example, be used to propel the ball and drive it along a long circular or reducing radius spiral track to add speed so that it is driving against a portion of the residual exhaust gas that has propelled the previous ball fired along this track in the prior firing. As described earlier, the prior ball's trip has driven pressurized gas over a pop-off or relief valve as it moves to return to its point of recovery and latch into a vacant ball socket in the periphery of a geneva gear where its latching impact provides a one-step movement of the geneva to open a new socket vacancy. The ball has left a trail of residual medium pressure exhaust gas along the conduit track for the following ball to compress. To drive the ball fuel gas is injected into the combustion chamber with compressed air and ignited. High heat is generated as the gas suddenly expands behind the ball that is held in a retaining grip in the geneva. The pressure instantly causes the ball to overpower this clamp. With release, the ball is now projected at high velocity to sweep up the residual hot exhaust gas along the conduit track and drive it into a shunt and across a relief valve to a receiver. This accumulated exhaust gas from the receiver vessel is pulse-released into a space between a very large pair of pistons for expansion. The action of compression reduces the said ball's speed so it can re-enter and latch itself in a geneva socket with a reasonable force that step-moves the geneva gear to brings a vacant socket into position while 180° around the geneva a new ball is moved into the firing position on the other side of the geneva circumference.

In this way a portion of the residual heat of the hot exhaust gas is put to use rather than simply blowing it up the stack from the combustion point as in normal engines that wastes all of this heat energy. The exhaust gas temperature is in the order of 1,500° F. which normally radiates through the stack walls before flowing to the atmosphere. The ball compression drives this hot gas into an accumulator vessel making the temperature even higher. The building temperature is controlled by flowing low temperature gas or steam vapors over the surfaces of the ball track conduit and the accumulator or receiver so the heat is used as gas or steam pre-heating before combustion, or the compression step.

In operation, a single unit, or a plurality of these ball/track units, can deliver hot exhaust gas into an accumulator or receiver as described that has a ceramic lining in the form of a torus tube functioning as a high pressure vessel capable of handling gases with temperatures and pressures as high as 3,000 degrees F. and 600 psia. The torus tube geometry favors the heat expansion problems.

The higher pressure Engine/Compressor form in which the piston function precedes the ball drive would be suited for refinery needs where lower volume and very high pressures are required as for example in the several stages for the compression of Hydrogen.

It is desirable in this unit to incorporate the drive device and compression apparatus inside the same structural body as noted in the Summary. This is accomplished in part with the incorporation of the Rotating Valving Cylinder form as the means for control in the apparatus. This compact apparatus affords a way to minimize unit cost and provide a smaller apparatus that more efficiently controls the losses of heat energy normally associated with separate engines coupled with compressors, while at once providing low-cost multiple unit installations that make for easier maintenance and down-time loss as opposed to taking a primary large unit out of service for refit. A small unit that is one of a dozen in operation can be shut down without loss of service.

This method and the apparatus forms provide the option of using Natural Gas combustion, or high pressure natural gas expansion as for example, from a gas well, to move pistons apart as in the Engine Compressor with elimination of the first stage ball drive. Such high pressure can also be applied in the Toroidal Turbine so it can perform as a prime mover for driving conventional pumping means as in pipeline situations or electrical generation. Very high pressure well gas can be taken off the well and let down between the pistons of the Engine Compressor or introduced to the ball drive of the toroidal Turbine with endothermic advantage for power generation and afterward exhausted to a tank separator for removal of butane and other liquids so the Natural Gas can be taken off at usable temperatures for delivery to the pipeline. The refrigeration generated can be employed to cool the gas to pipeline levels.

The Engine/Compressor of this invention is designed to make maximum use of a continuous flow of hot gases from combustion, or modulated ignition timed to coincide with the pulsed introduction of an ideal gas/air mix to a combustion chamber closed by a rotary valve as a ball projectile is clamped at the opening or entrance of a track conduit, along which the ball is propelled by combustion release to overcome the clamp. The moving ball compresses the residual exhaust gas standing in the tube that remains from the prior ball firing. At the ball termination, latch point or sprag block, the gas ahead is shunted to a receiver, as a like plurality of successive ball excursions contribute a pressure accumulation suited to release for use as a first or second stage pressure depending upon the application.

The travelling ball passes a sensor point near the end of its circuit that indicates the end of the ball excursion where it is braked by the compressed gas ahead so that it has a controlled impact against a standing socket or vacant space between the "latches" of the geneva gear. The geneva or stepping gear position is generally at right angles to the ball travel, but a curvature in the path at the end of the ball travel causes it to impact angularly against another ball standing in a geneva socket. The force vector at an approximate 45° to the geneva face or axis causes it to turn one step to move off a detent retention, which same impact moves a second ball held at a distant point around the geneva's circumference to move into the clamped firing position. As the gas burst occurs and the ball ejects, it passes another sensor point as it begins its circuit. This ball's operational cycle provides the first stage compression of the gas in one Engine/ Compressor configuration of this invention and, as the balls pass the sensor points, the two pulses and the interval between comprise the travel time used for control of the ignition timing and fuel input, but equally important is the stepped movement of the geneva gear as provided by the balls' impact force. The rotation of that geneva gear is an integral part of the holed cylinder body that encloses the piston. The cylinder's rotation by this means provides the porting or "valving" for the timed introduction of the gas input and output release to the pistons inside the cylinder body. The injection of fuel gas to the combustion chamber and to any other requirements are accomplished by simply varying the number, positions and sizes of these ports in the cylinder body as they step-turn and relate to aligned ports in the enclosing outer static stator structure holding the cylinder. Manifolds encircle the piston cylinder walls internally and serve these ports. The stator has like manifolds internally in its walls with ports that align with those of the pistons ports to serve the input and output needs of this engine/ compressor unit.

The gas in the first stage receiver is compressed by a specific plurality of ball excursions and is delivered to a position between two pistons, forcing them apart as this introduced compressed hot exhaust gas expands in this space to create an endothermic or cooling condition in this exhaust gas. The pistons are moved apart by this means against the product steam or gas that has been introduced on their opposite sides to be compressed. The enclosing cylinder rotates independently of this piston action in response to the ball impacts.

As the pistons move against this product gas space to compress it, they also close against open compression springs. The product gas or steam is exhausted over pop-off valves, and the pressure of the hot exhaust gas expanding behind the pistons is released as the pistons move past ports through which all of this driving pressure is exhausted. The springs return the pistons and suck in new product gas to this space through ports that are also in the cylinder and stator walls and are timed to open as the cylinder tube is step-rotated by the geneva to those positions. This rotary cylinder means and porting alignment eliminates complex valving and valve mechanisms for actuation.

Before full release, a portion of the exhausted gases that have driven the pistons is moved into a manifold area inside the walls of the cylinder and out a plurality of small perforations in the outer wall periphery to provide for the escape of nucleate steam bubble pressure as a product of the water that is a part of this exhaust gas. These bubbles form on the small openings and provide the support for the rotation of the cylinder as they expand, burst and are replaced. In a like manner small openings in the periphery of the pistons function in the same way.

These functions are described in detail in my co-pending U.S. patent application Ser. No. 08/653,967.

In a related function as noted earlier, the tubular form in which the balls travel has a cross-sectional configuration in which at least one-half of the tube's inside diameter is a suitable fit to facilitate rolling of the ball while at least half or more of the remainder is very slightly larger for clearance of the ball diameter, which surface obviously is turned in opposition to this half of the tube as it rolls against the other half. This fit and space provides the ability for the ball to roll freely if gravity or centrifugal force is used to cause the ball to rest or roll in the fitted surface, otherwise it would fall away and be too loose. To overcome this problem and to assure the position of the ball in transit, a means is provided to create a pressurized nucleate bubble input into this larger diameter space. This also provides the means to permit free rolling and the sealing of the space between the ball's surface and that of the larger space diameter in the tubular conduit. This is done with use of a finite slit opening or other means that runs most of the length of the tube. This is placed in the cross-sectional center of the larger radius fit so this space between the conduit wall and the ball's line contact afford an area for the nucleate bubbles to squeeze past in the passage of the ball as it rolls. The slit or other means is supplied with input by a small manifold tubular form that runs parallel on the larger diameter side of the track to service the slit or other means. Functionally pressure behind the ball moves into this slit and out of the slit ahead of the ball travels. This occurs because the pressure is much less ahead of the ball as its travel begins, and the nucleate bubbles bead up along the slit in the path of the approaching ball to be swept under the ball and through this larger space around the ball's line contact as its high speed creates a momentary laminar layer of ball-like bubbles for it to roll over as it swings around this curve in its travel. The pressure in this space is greater than the pressure ahead in the compression area. At the calculated point in the track where the gas pressure in front of the ball begins to build to equalization of the pressure behind, the slit is terminated.

The geneva gear step rotation provided by the ball's impact turns the cylinder body inside a sealed laminar space that is itself filled with explosively expanding steam bubbles that escape through pressure limiting orifice openings at the cylinder ends and around its periphery. This support eliminates the need for bearings or seals as well as lubrication, affording ability for the cylinder to move in its step-turning at 10 to 20 rpm without friction on this mass of nucleate bubbles that are constantly forming, expanding and escaping. The ability to dispense with bearings and seals in this apparatus is of great benefit because at the high temperatures, lubrication of normal bearings would be a particular problem in the carbonization of such lubricants. This elimination greatly simplifies service and maintenance.

If a cycle comprises three-balls moving in the circuit, each such group would for example supply the pressure for one piston excursion of the second stage. The accumulated pressure of the three-ball excursions may for example provide the force for one stroke each second and, if there are eighteen step provisions in the tooth-like sockets of the geneva, it would then rotate 1/6 of a revolution per second or at a speed of 20 rpm. By providing six hole positions in the cylinder tube for alignment with six in the stator input and output for the piston functions, one stroke of the piston pair can be provided each second.

In this way 11 balls work the system. One is in transit in the loop and the remaining 10 are standing and filling half of the geneva sockets in the circumference.

Each ball excursion moves the cylinder one step. The first impact and geneva position step opens ports to introduce product gas for compression. The second ball impact gates the input of hot exhaust gas to move the pistons apart, and the third ball impact opens ports for release of the driving gas so the spring return can suck in product gas for compression as the first ball of the next three-cycle program impacts to open the product gas input ports. A series of notch-like cuts in the outer wall of the stepping cylinder provides intermittent openings to adjoining gas pipettes meeting at these notches so the gas input for ignition can be time-pulse synchronized with use of the same stepping cylinder function.

The Tower Compressor

A third form of this invention is a relatively simple Tower Compressor that makes use of the nucleate bubble piston support on a large piston and in a long cylinder form that can be used to compress low pressure steam as it comes off the turbines as in an electrical power plant. This steam is compressed to a high pressure and temperature without return to the boiler. After compression it can be reintroduced to the turbine and, when expelled from the turbine, does not require passage through condensers, but goes directly back to recompression in the Tower Compressor with some steam makeup from a low horsepower and low pressure/temperature boiler.

With the use of a plurality of Tower/Compressors and the gas combustion units of this invention, several in tandem can provide as much compression volume as may be needed to compress vapor to saturated steam pressures and temperature just below that of superheat, or as close to 1,000 psia and 544 degrees F. as possible in substitution for boiler steam generation and use with a turbine drive, or the Tower Compressor units can be used in successive stages with the last unit making a pulse transfer of the steam directly into a boiler. This could be done to recover surplus low pressure steam and prevent the energy loss if it were simply dropped to the water phase.

In a power plant steam compression situation the natural gas used for combustion in a Tower Compressor is a fuel at the lowest possible rate and compares favorably to steam produced with natural gas using conventional boiler means.

The Toroidal Turbine

A fourth method and apparatus application of this method is an enclosed torus ring, held within a like fitted and enclosing torus stator space, in which it turns. A helical coil-like grooving on the outside diameter of the torus ring in left-hand lead form moves against adjoining right-hand lead grooving in the enclosing stator inside diameter. At each groove cross-over point one of a plurality of balls is retained in the adjoining grooves between the stator and torus ring. The inside diameter of the enclosing stator torus body is cut away at the center to make an opening in the stator case exposing the torus ring. This opening has an included angle, of less than 180 degrees so it fits around an elliptical hyperbolic rotor form at the center of the rotor shaft (split so it can be assembled from each end) which said rotor elliptical surface is grooved with a left-hand lead. This said grooved elliptical rotor shaft surface exactly fits the curvature of the torus ring center to close the cut-away space in the stator body. The edge faces at each end of the elliptical hyperbolic shape seal to the stator cut-away edge surfaces to close this circular opening completely. In this way the rotor shaft fit essentially replaces the section of cut-away stator and it turns within this part of the stator as driven by pressure propelling the balls trapped in the groove crossover points between its elliptical surface and the torus ring.

A disc is affixed to the outside centerline edge of the torus ring as a thin encircling holed plane. Holes in this remain aligned and fixed with the half-round ball grooves in the torus ring. These disc holes intermittently align with the half-round holes in the stator at each of which intersection points a ball is trapped. The hole in the disc allows the passage of the ball at this point, after which passage this opening is closed by a space between like holes in an extension of the stator that telescopes over the encircling torus ring disc to provide this closure. Additional holes in the disc comprising two larger diameter hole circles provide valving means to introduce pressure behind the ball just passed and also exhaust the pressure as it and others complete one turn or toroidal loop around the torus ring. The disc turns as a part of the torus ring, moving inside a stator slot that is totally enclosed by the said extension from the stator body that telescopes over the disc ring to stand stationary inside the torus ring outer circumference. This static enclosure of the disc provides for complete closure of the ball passage ports after the ball goes through as a barrier to a pulse of pressure applied behind the moving ball.

The timing of the ball rotation is synchronized, because each ball has a trapped position. Balls arrive at each hole in the disc at the same time to pass through the holes that are closed behind them immediately by the stator extension enclosing the holed disc. The pressure input hole is opened instantly and the balls are propelled by a burst of fluid or gas. It closes and the next ball is admitted, until three are in the circuit with each receiving a new burst of pressure after it passes through the disc ball hole. The marginal by-pass slip moves forward to add pressure to the ball ahead in each case. As the three-ball series move in their traps the stator groove is fixed so the ball must push against the torus ring groove so it is forced to turn in its plane around the rotor axis. The first ball of the three travels around the torus ring to arrive at the junction of the rotor shaft grooving. The rotor grooves are arranged to provide a part of one cross-over point and this ball is now handed off to an opposite hand groove lead for the second time and the rotor shaft is turned until the ball moves off the shaft groove to the outlet point in the stator where pressure is released. The significance of this is the multiplication of the pressure. If there are 20 toroidal loops and 20 balls are introduced at the same time with three driven around each loop by pressure pulses, the pressure input is multiplied approximately by 60. Optionally the grooves can all be of one hand and made with increasing angles of attack which should afford some improvement in noise level.

OBJECTS OF THE INVENTION

An object of the invention is to accelerate continuously a series of balls in a short or continuous tubular track to compress lower pressure gases ahead of the ball by applying higher pressure gas behind it to force the hot pressurized exhaust gas ahead of the ball into a track shunt and pressure receiver.

An object of the invention is to make the said tubular track circular in form to provide a centrifugal force and maintain the ball in the outer rolling fit portion of the cross-section of the tubular form.

An object of the invention is to make the said tubular tract circular in form with a diminishing spiral curve to increase the ball speed at the end of the circuit.

An object of the invention is to make the said tubular track cross-section in two diameters, one that fits the ball to provide rolling action and the other to provide rolling clearance.

An object of the invention is to provide a finite slit opening running the length of this tubular form connecting with a small tubular manifold form closely placed and parallel to the large tubular form in which the projectile ball travels.

An object of the invention is for this tubular form to permit the passage of high pressure gas from behind the ball to a position in front of the ball with movement through the said slit so that nucleate steam bubbles form along the slit inside the large tube conduit as the ball approaches.

An object of the invention is to provide these said bubbles as a means for sealing the laminar space in the larger diameter one-half section of the ball conduit around the ball as it rolls over the said balls which favor the rotational direction.

An object of the invention is for a ball to terminate its tubular passage with impact against another ball held between the divisions of a geneva gear device that is mounted on a cylinder.

An object of the invention is that the angular impact of the ball against another held in the geneva gear device cause the said geneva gear device to move one indexed division of the cylinder to which it is attached in a like single step in its rotation.

An object of the invention is for the ball to impact and move the geneva ball gear device one step and eject another ball several steps removed from the impact point on the geneva on the gear's circumference so that it moves into a latching position preparatory to being pressure driven into the ball tube conduit.

An object of the invention is to accumulate the compressed gases derived from a plurality of ball excursions in a receiver held under pressure.

An object of the invention is to release this accumulated gas pressure at intervals to an input point between two center located pistons in a cylinder body stepped by the geneva gear.

An object of the invention is for this introduced gas pressure to be taken down with gas expansion in space between the piston forcing them to move apart and compress product gas in the cylinder at the opposite ends of the pistons.

An object of the invention is for this introduced gas pressure and piston movement to compress steam at the opposite ends of the pistons.

An object of the invention is for the cylinder, as rotated by the attached geneva gear step positioning, to open holes or ports in the cylinder wall to align these with holes or ports in the stator body for timing the input and output of all gases in the control of piston motion in the first stage ball projectile movement and the subsequent piston excursions.

An object of this invention is to use a form of latching means to retain the projectile ball in a breech-like position on the geneva until the driving pressure burst breaks it free from the latch and sends it on its excursion through the tube or conduit for compression of the residual gas in its path.

An object of this invention is to use a torturous path of turns in which projectile balls stack at the ejection point with employment of an adjustable sprag pin to prevent the projectile balls reversing direction as ball launching pressure is applied.

An object of this invention is to employ a projectile ball driven from and to a geneva gear latching apparatus mounted on a control porting cylinder into a tube conduit as a first stage compression means to introduce pressurized gas to a space between pistons in the said cylinder that are driven apart by this expansion to perform a second stage compression function on a product gas at the opposite end of the said pistons.

An object of this invention to employ pressurized steam introduction and expansion to drive a large piston with a small diameter piston extension into a smaller cylinder space, the cylinder of which is a rotating porting apparatus moved by a geneva gear latching apparatus, stepped by projectile balls that are propelled by the amplified piston steam pressure as a first stage compression function, the steam from which drives the projectile ball against the product steam trailing residual remaining in the conduit tube from the prior ball firing, which said last compression is the second stage.

An object of this invention is to employ the generation of nucleate steam bubbles from the water content of gas combustion exhaust as expelled from the perforated outer surfaces of pistons or from the perforated walls or ends of cylinders as used for a laminar support between surfaces of these elements when employed from the compression or expansion of gas products in the transfer of energy.

An object of this invention is to compress steam to restore heat and pressure to this spent gas without the use of a boiler or condenser in the cycle of use in such steam in the generation of electrical power or other energy transfer function.

An object of this invention is to compress steam to restore heat and pressure to this spent gas without the use of a boiler or condenser in the cycle by applying the combustion of natural gas as the driving means for a free piston apparatus in the compression function.

An object of this invention is to compress steam to restore heat and pressure to this spent gas without the use of a boiler or condenser in the cycle by the use of volumes of low pressure steam with the piston size pressure amplification free piston means of this invention as the drive for this compression procedure.

An object of this invention is to compress steam with a heavy free piston apparatus in a vertical or inclined cylinder at the bottom end of which a breech-type recoil mounted chamber is pulse-controlled to direct natural gas combustion pressure into the breech and cylinder barrel to drive a free nucleate bubble supported piston projectile upward against a coil spring return to drive pressurized gas over a pop-off valve at high pressure and temperature, which piston's upward travel has relieved the pressure behind it to open a delayed spring closing the exhaust port so the combustion gas exhaust can escape, and the piston can be dropped by gravity and the low pressure product steam input at the cylinder top, which piston drop closes the spring valve port so combustion firing of gas input provides the drive to repeat the compression stroke.

An object of this invention is for a heavy free piston compression apparatus to be driven with Natural Gas combustion means in which the spent steam from a generator turbine or a petrochemical process is returned to the said free piston apparatus; first through a coil surrounding the 1,500 degrees F. exhaust tube for the compression gas which raises the spent steam pressure and temperature so; secondly it can be injected into a coil enclosing the free piston cylinder which reaches high temperatures created by the steam compression function and which steam injection to this larger coil provides expansion and an endothermic temperature reaction to control the temperature of this cylinder.

An object of this invention is to compress steam with a heavy free piston apparatus in a vertical or inclined cylinder at the bottom end of which a breech-type recoil mounted chamber is pulse-controlled to direct natural gas combustion pressure into the breech and cylinder barrel to drive a free piston, and which recoil function is harnessed with a plurality of compound piston cylinder assemblies to provide for the compression of air needed in the natural gas/air mix for combustion and at once pump the water input to attemperation mist apparatus to inject water make-up to the coils on the compression cylinder.

An object of this invention is to use a very low pressure and temperature boiler in the range of 25 to 50 horsepower to replace the very large boilers in a normal 50 megawatt electrical generation system as the startup means to make the initial warm-up and operating steam to start the free piston compression apparatus.

It is an object of this invention to employ a light weight hollow titanium ball with a high finished hard chrome surface when large projectile balls are required.

It is an object of this invention to use a valving means in which a square form wire size compression spring is finished by grinding all the surfaces to closely matching finishes so, when closed, the spring presents a series of virtually sealed surfaces between the coils, so when closely fitted to cylinder walls with a port, the closed coils close the port and, when extended space between the coils open the port in the cylinder wall.

It is an object of this invention that when using the square section ground spring as a port closing valving means, its action be delayed in opening from the closed position by a second spring that is a flat cross-section ⅛ inch to ¼ inch leaf type that is of a width 1½ inches to 3 inches and wound upon itself with one turn and thereafter ground on the I.D. and O.D. ends to a good finish and, so all dimensions exhibit close tolerances in wall thickness, which spring application is to fit closely within the respective cylinder I.D. so it is seated against the top of the square section bottom coil spring.

It is an object of this invention that the said flat cross-section spring as described above fits so closely to the cylinder wall that the square spring when opened can only slowly overcome this friction rather than simply snap open as the piston's downward pressure is relieved.

It is an object of this invention that the said flat cross-section spring as described above fits so closely to the cylinder wall that the square spring when opened can only slowly overcome the friction fit because the explosive pressure against the said flat spring's inside surface, as the pressure impacts the piston's bottom, causes the flat spring's single turn to unwind slightly, making the spring's diameter larger inside the cylinder, which grip holds until the pressure drops, so the square section spring can maintain the port closure and allow the piston to move almost to the top of the cylinder before this exhaust port opens.

It is another object of this invention to use a plurality of projectile balls that are held within a continuous toroidal helix series of tubular form turns that are arranged so each turn, loop or helix loop enters and exits and a mounted stator on the inside bore of which straight grooves run the stator length having a half-round fit to the projectile balls, the other half of which fit like grooves in a rotor that is a close rotational fit inside the stator bore, but which grooves have a lead angle so each groove makes a single turn around the rotor surface in one revolution, so a series of balls, one in each groove of the stator and rotor as driven by pressurized gases, are forced to pass along the straight rigidly-held stator groove so the rotor is forced to turn with the sum of the pressure as applied to all the balls simultaneously in the transmission of pressure energy to rotary energy.

It is an object of this invention that the projectile balls be used within a three part apparatus comprising a stator with an internal torus space having grooves on its inside diameter.

It is an object of this invention that the projectile balls be used within a three part apparatus comprising a stator with an internal torus space having grooves on its inside diameter and a torus ring with grooves on its outside diameter fitted to this internal grooved stator space.

It is an object of this invention that the projectile balls be used within a three part apparatus comprising a stator with an internal torus space having grooves on its inside diameter and a torus ring with grooves on its outside diameter fitted to this stator space, the center part of which is cut-away to receive an elliptical hyperbolic shaped rotor at a shaft center with grooving on its outside diameter to fully close this stator torus center cutaway opening.

It is an object of this invention that the projectile balls be used within a three part apparatus comprising a stator, internal torus ring and elliptical hyperbolic rotor shaft in which the grooves of each are of opposite hand leads with cross-over points that retain balls driven by pressurized fluids or gases.

It is another object of this invention that projectile balls pass through holes in a torus ring mounted disc to serve as means for passing the retained balls at the cross-over point between the stator and torus ring.

It is an object of this invention that projectile balls pass through holes in a torus ring mounted disc to serve as means for blocking the backup of pressure as applied behind the moving ball after its passage.

It is another object of this invention that the torus ring disc be provided with holes in proper positions to admit pressurized fluids or gases to the inlets behind the ball after passage though the ball holes of the same said disc.

It is another object of this invention that the torus ring disc be provided with holes in proper positions to exhaust pressurized fluids or gases from the outlets ahead of the ball before passage though the ball holes of the same said disc.

BRIEF DESCRIPTION OF THE DRAWINGS

FIG. 1 is a cross-section view of a two-stage compression unit in which piston/cylinder size differences provide pressure amplification to a ball projectile driven from a geneva-like gear latching mechanism that is turned by the ball impact and which rotation also rotates a cylinder enclosing the piston pair which cylinder rotation provide porting and the control of all input and output of gases.

FIG. 2 is a cross-sectional side view of the ball track showing the centrifugal force desirable to retain the ball in the fitted part of the track.

FIG. 3 is a sectional view of the collet jaw latch that is spring-locked to grip the projectile balls in the geneva stepping positions.

FIG. 4 is a cross-section of the geneva ball gear.

FIG. 5 is a side view of the ball in the latch, the spring elements and the two positions of the collet latching jaws together with the sealing torus ring.

FIG. 7 is a cross-section of the ball conduit tube showing the fitted and large circumferential difference that accommodates the nucleate bubble formation as supplied from the small tube form manifold that runs parallel to the larger diameter and feeds that space through a slit between.

FIG. 19 Cross-sectional view of perforated piston.

FIG. 20 Cross-sectional enlarged view of piston perforation edge.

FIG. 21 Perspective view of a piston in cut-a-way showing manifold.

FIG. 24 A fragmented sectional top view of the assembly taken along line 24—24 of FIG. 23.

FIG. 25 A fragmented sectional view taken along line 25—25 FIG. 23 showing the rotor and stator adjoinment relationship as well as the ball return path openings in the stator wall.

FIG. 26 A fragmented sectional view along line 26—26 of FIG. 23 showing the rotor and stator adjoinment at the ball entrance at the rotor end.

DETAILED DESCRIPTION OF THE INVENTION

Figure 6:
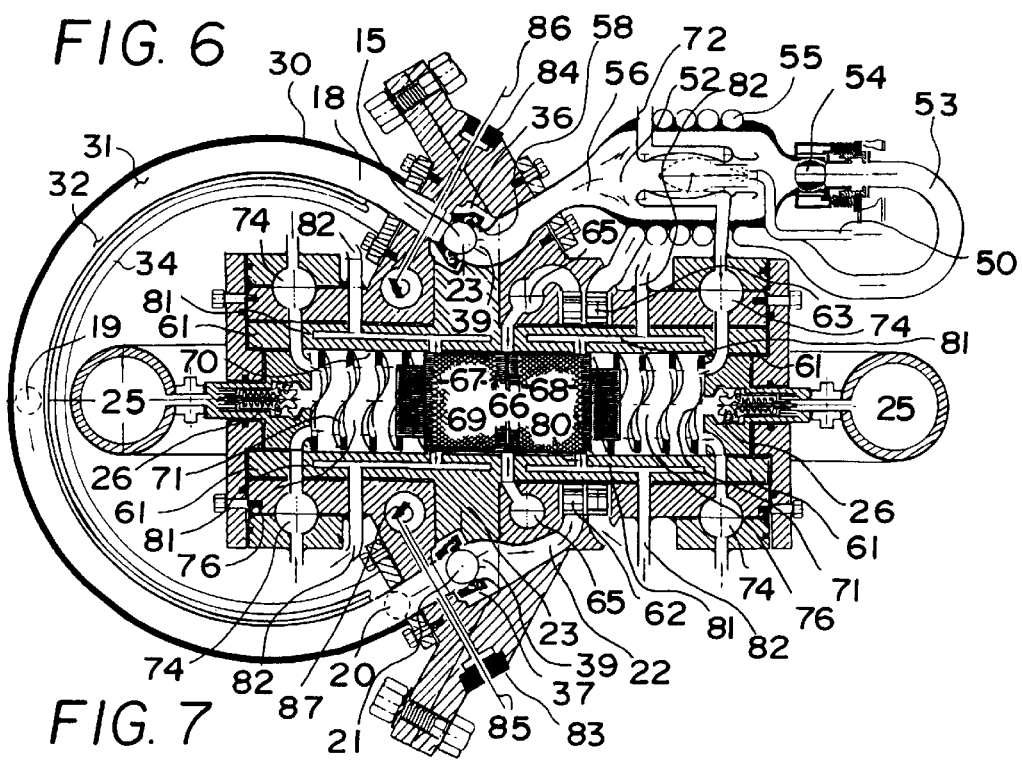
FIG. 6 is a cross-section view of the engine/compressor unit of this invention.

FIG. 1 In this schematic illustration the introduction of natural gas and a combustion chamber is ignored. What is shown is the movement of a projectile ball at positions 18, 19 and 20 in a diminishing curve tubular enclosure 30 and a piston 3 and 4 of two sizes that engage a cylinder configuration 29 that is turned by a geneva gear 23 ball latching apparatus 36 and that serves to catch and eject the balls from the firing positioning 7 showing the ball 15. The cylinder body 1 is forced to move one step in rotation by the gas pressure driving the ball 15a on its return at 37 impacting the stepping geneva 23. This rotation of the cylinder 1 aligns porting 8, 9, 11, 12 and 13 between it and the stator 2 to admit and expel gases. The sealed stator enclosure 2 holds the cylinder 1 without bearings or rotary seals because the cylinder 1 is supported in the stator 2 bore by an array of perforations 28 around the sides and ends of the cylinder walls from which nucleate steam bubbles are expelled so this element turns freely as stepped by the geneva 23. (Wall manifolds that supply this steam are not shown.) The Large size piston 3 in the large portion of the cylinder 27 has a like perforated steam-fed area on its surface 14 that holds the piston on a like laminar nucleate bubble steam layer spaced away from the cylinder walls. An extension of this piston at 4 drives into a smaller cylindrical space 7 that serves to drive the ball 15 out of the latch 36 (shown simply as a spring representation here) into the diminishing tube conduit ball path 30 at ball position 18. Pressure for driving this apparatus enters the stator at 8 and 9 and through porting in the geneva rotated cylinder body 29 which ports are timed to align for this input after which they are closed by the rotation of the body 29. The port timing function is not shown here but is largely a function of port positioning. Ports 10, 12 and 13 are opened as needed for control of the piston's drive, exhaust and return stroke. Low pressure steam is introduced into the master cylinder 27 at port 10 which is then closed by the cylinder turn. The piston is driven forward by high pressure steam delivered at 8 and 9 as these ports are opened. The low pressure steam moves through ports 12 and 13 to point 17 as these open. (In some cases these ports are slots in the stator of some length to accommodate longer times for inputs as in the case of 12 and 13.) These provide for introduction of a low pressure steam volume ahead of the ball 15 before it bursts out of the retention 36 as driven by the higher pressure of piston 4 in the small cylinder 7. As the small piston extension 4 closes the opening of the small cylinder 7 further steam cannot enter at its opening border 5 and 6. There is some momentary high compression as the large piston 3 passes ports 12 and 13 through which it has driven the maximum input of steam behind the ball 15 which is now at position 18. As the large piston 3 closes the final cylinder space of 27 the compression provides a momentary back pressure "bounce" for the return stroke as the piston 3 moves back to its starting position. The ball 15 runs through positions 18, 19 and 20 in a diminishing diameter or spiral to reach its entering point at 21. The reduction of ball path diameter 30 to 21 causes some acceleration of the ball to offset the dropping drive pressure and the increasing pressure ahead of the ball at the end of its excursion 21 and before it finally reaches the latching position 37 in the geneva 23. The rotational direction of the geneva is shown at 24. As the ball has latched at 37 it has driven the gas ahead of it over the pop-off valve at 26 and into a receiver at 25 from which it is delivered to points of use.

FIG. 2 is an open schematic of a tubular form ball pathway 18 used as the conduit for the ball excursion of this invention in which the ball position 19 is shown to correlate with the ball position 19 in the FIG. 1 illustration. The outer half of the tube 18 radius 31 fits the ball while the inner radius half 32 is slightly larger in diameter so the ball can roll freely on the fitted diameter 31 and be clear of diameter 32.

FIG. 3 is a sectional view of the spring activated collet-like clamping jaws of a retention device for latching the balls in the geneva gear stations so the spring tension can be overcome by pressure on the ball to expel it from this position. The jaws 36 fit and turn around the ball 15 diameter with a knife edge 42 on each jaw, the sharp edge of which permits this curving fit around the ball diameter. This edge 42 also extends to encircle the cross-sectional diameter of the body circumference of a precise metal torus ring 40 in which the ball 15 comes to rest when latched. This ring has a very close I.D. running fit for a ball of class RC3 or equal. This metal torus ring 40 constitutes the "sealing" surface against and around the ball while in the geneva latching position with the spring pocket FIG. 5, 39, as a part of another annular ring assembly that has a static fit to the torus ring 40 and in turn is held in the body of the geneva in a like manner so the area is sealed by the fit between the torus 40 and the ball 15 for minimal bypass slip. The jaws are shown in an open position 36 and closed 37. When opened the jaws exhibit some spaces in the adjoining interval and springs 41 maintain these annular positions in relation to one another. The jaws are on the down stream side of the sealing torus ring 40.

FIG. 4 is an illustration in cut-away showing two of the balls at rest in the sockets 23a of the geneva gear 23. Only two latches are shown in the interest of clarity, however a jaw latch 36 is located at each socket position. A jaw 36 is shown in the closed position with a ball preparatory to firing. Another jaw 36 is shown holding a ball at position 21 having just received the ball. The bore of the small cylinder of FIG. 1 is shown at 7.

FIG. 5 This is a cross-sectional side view. The geneva housing is shown at 23 and the open jaws 36 are closed 37. The ball 15 is seated on its exact maximum diameter center in the torus sealing ring 40 and held here by the accurate and precision placement of jaws 37 that are in the closed position. The individual jaw springs 39 are shown in the position they assume when the jaws are closed.

Figure 7:
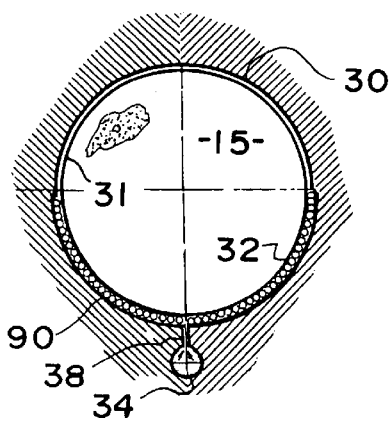

FIG. 6 A cross-sectional schematic drawing of the engine/compressor of this invention in which two stages perform the compression work. The first stage makes use of a ball projectile driven through a tubular conduit that compresses the hot exhaust gases used in propelling the pistons of the second stage in which a piston pair in a cylinder receive the hot exhaust gas inserted between them so they are driven apart to compress a product gas that is on the outer or opposite ends of the pistons space 76. A gas flame combustion center 51 receives gas input from pipe 53 and supercharged air input pulsed by rotary valve 54 as this valve receives its air delivered from a heating coil 55 wrapped around the combustion chamber 51. The air input is pulse introduced to the chamber and mixed with a gas from pipe 50 just before reaching the combustion point at 51. The gas explosive burst at 52 expands in the tube breech space 56 to flow beyond the ball stop 39 in space 58. The building pressure behind ball 15 as held in latch 36 of the geneva 23 while the ball 21, 180° from the ball 15 that has just seated itself in an open latch 37 creates a shock of its impact that adds physical force to the building pressure to dislodge the ball 15. It bursts into track 30 which is the opening of the conduit path 18, 19 and 20. The ball 15 is then driven by the gas flow and expansion behind it through these positions finally ending at 21 after forcing the exhaust gas into conduit 22 and beyond across the air impeller 62. Impeller 62 drives a blower 63 delivering air to the combustion chamber jacket heating coil 55 along pipe 53 for input to pulse valve 54. The exhaust gas after driving the impeller 62 has lost velocity but not pressure which accumulates in the chamber 65 past a check valve not shown. This chamber 65 encircles the center cylinder assembly 61 that holds two pistons of the nucleate bubble support type 67 and 68. When the porting in the cylinder wall 61 aligns with that in the stator that connects to reservoir 65 the pressurized exhaust gas moves into the space between the pistons 67 and 68 at 66. This forces the two pistons apart closing the spaces 76 and compressing springs 71 to compress the product steam or gas that has previously been sucked into this space through ports from manifolds 74 fed by prior steam passage to port 72 and through a combustion chamber heat exchanger encircling area 52 for preheating. The compressed steam of space 76 is driven out over pop-off valves at 26 to the high pressure receiver at 25. As the pistons 66 and 67 reach full compression in cylinder 61 and space 76 a plurality of ports 80 are opened to finally release the fully spent exhaust gases into the cylinder wall manifolds at 81 and out vents at 82. The manifolds 81 have some low pressure steam injection (not shown) so they can service the perforated cylinder support surfaces as illustrated at 70. These are provided on much of the cylinder surface in bands between porting orifices. The perforations 69 of the piston like those of 70 on the cylinder wall serve to propagate the nucleate bubble generation that is the support for the cylinder and the piston in the cylinder. While not shown the ends of the cylinder have similar perforated surfaces that connect to the wall manifolds to maintain the cylinder center position in the enclosing jacket. The excursion of the first stage ball passing along the tubular track that, as shown in FIG. 7, has two diameter dimensions, half at 31 fitted to the ball and half of the cross-section at 32 slightly larger than the ball. This permits the introduction of bubbles along a slit that separates this large tube track from a small parallel tube 34 that is a manifold for exhaust gas input that is not shown here. It is important for the timing of ignition and gas input that the position of the balls be known at the start of the excursion and at the end. A pair of quartz windows mounted in a Kovar sleeve as shown 83 and 84 can serve to pass the light of a laser 85 and 86 from a remote source through a bore to an annular opening in the stator that fitted with sensors as at 87. The ball passage provides an interruption of the laser light at the beginning and end of the ball's trip which would be used to integrate with all the other timing so the operation could be properly synchronized. The laser light would penetrate exhaust gas in this narrow passage and also penetrate high temperature steam that is essentially invisible. The use of the laser and quartz window means is described in my Provisional Application No. 60/019153.

FIG. 7 is a cross-section of the tube 30 showing the ball 15 in the tube with the size in diameter difference at 31 and 32, the slit 38 that forms the bubbles 90 as they accumulate in the space between the ball and the large diameter portion of the tube 32 as the ball travel sweeps them up as they are generated from the small tubular manifold at 34.

Figure 8:
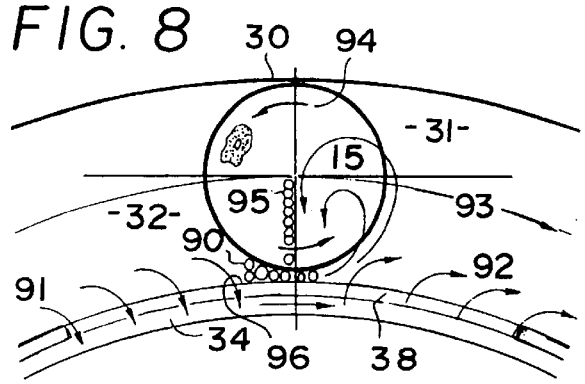
FIG. 8 is a side schematic of the ball in the track showing the function of the bubble entering the slit and exiting the slit in advance of the ball.

FIG. 8 is a side view or schematic of the ball 15 in the tubular track 30 illustrating the ball's rolling direction at 94 and 95. The ball moves against the fitted surface of 31 rolling as in 94 and 95 imparting the direction shown at arrow 93 and the clearance of the ball at 96 in the space of the other larger diameter half part of the tube's cross-section 32 that is filled with nucleate bubbles as accumulated beneath the ball at 90 as delivered through the slit 38 from the tube manifold at 34 so they move into the manifold from the pressure behind the ball at 91 and exit ahead of the ball back into the manifold through the same slit 38 as seen at 92.

Figure 9:
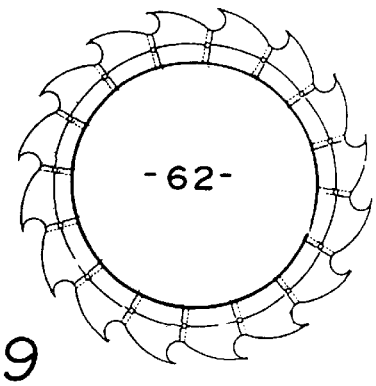
FIG. 9 is a cross-section of the hot gas impeller of the air blower unit for super-charging the combustion chamber.

FIG. 9 A plane view of the hot exhaust gas drive impeller 62 of FIG. 6.

Figure 10:
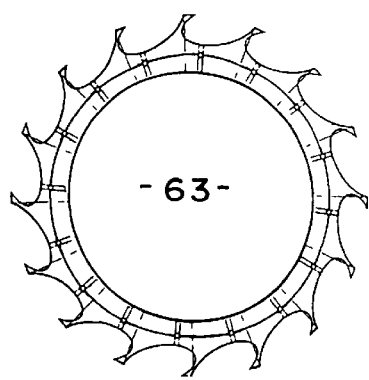
FIG. 10 is a cross-section of the blower impeller of the air blower unit.

FIG. 10 A plane view of the air blower impeller 63 of FIG. 6.

Figure 11:
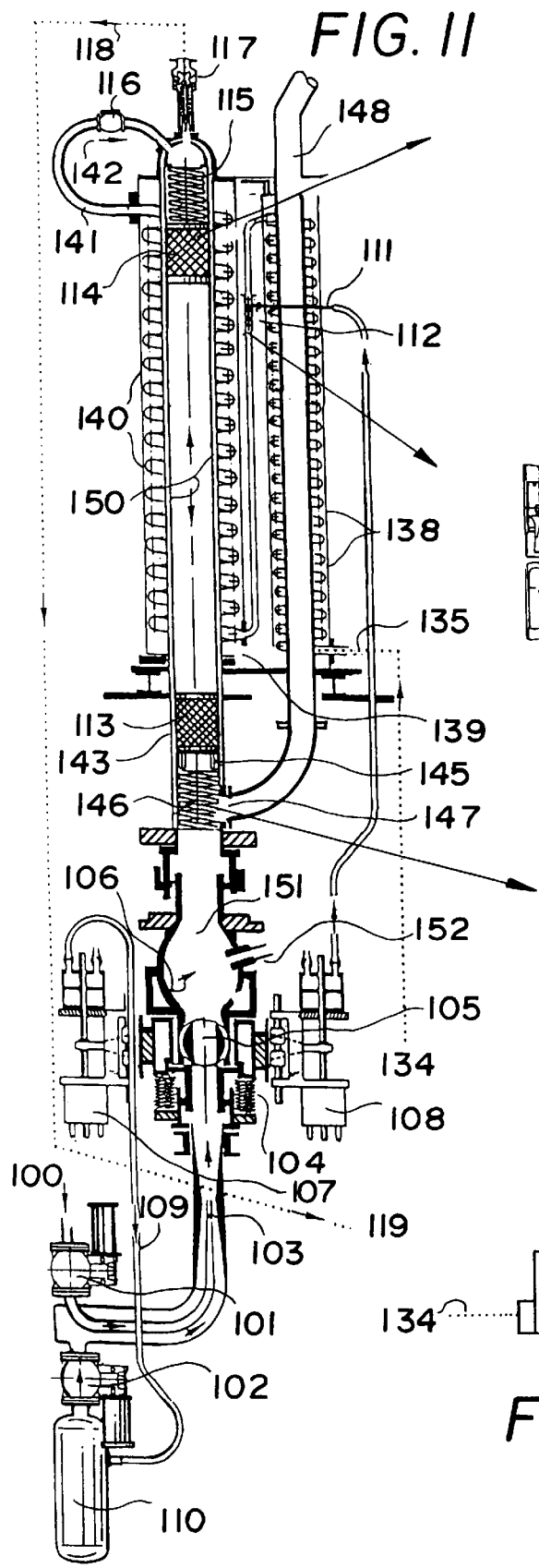
FIG. 11 is a cross-sectional and schematic view of the steam compressor apparatus of this invention consisting of the natural gas pulse firing assembly, the recoil mechanism, the pumping accessories for air and water and the cylinder column with piston positions, reheating steam coils and attemperation feedwater unit.

FIG. 11 A cross-section and schematic side view of the steam compressor that serves the Toroidal Turbine Prime Mover. This unit is driven by Natural Gas compression that is shown entering the unit through pipe 100 and valve 101 jetting into a compressed air stream mixing point at 103. The compressed air is controlled by a like valve 102 to that of the gas valve and both are high speed rotary type stepping motors controlled and synchronized to the ignition 152 and the rotary pulse valve 105 that inputs the air gas mix to the combustion chamber 151. The gas explosion of some force here is handled with a recoil mechanism 104 that in turn is used to drive a plurality of double acting pumps 107 and 108 to compress air as delivered through pipe 109 for the reservoir receiver at 110 and to pressurize the water with double-acting pump 108 delivered through 111 for the attemperation unit 112 that serves as a feedwater input for the master preheating steam coils 140. The gas explosion propels the piston 113 to position 114 moving through the long vertical cylinder 143 to move the gas 150 within this space. The piston at 114 has compressed the steam content of the cylinder 150 previously sucked in by the same piston's return stroke after it has rebounded off compression spring 115 and driven the compressed steam over the pop-off valve at 117 and through pipe 118 and 119, for use as high pressure steam. A check valve 1 16 in the input steam line prevents this pressure from flooding the steam return. At the top of its stroke as shown at 114 the square section bottom spring 146 has overcome its pressure activated friction retainer 145 and opened an exhaust valve 147 to the exhaust stack 148 and as the piston drops to the position 113 it drives out the hot exhaust gases. The 105 pulse valves open momentarily so the compressed air from the opening of valve 102 can be blown through the combustion chamber to clear it completely of residual burned gases. The piston completes its downward fall to 113 pushing the friction retainer 145 downward to close fully the coils of the square section precision ground spring 146 that at once fully closes the exhaust port 147. The system is ready for a new gas explosion. When this explosion burst does occur it first provides pressure on the friction retainer 145 expanding it against the cylinder wall to hold the square section spring 146 at its position momentarily so the exhaust port 147 remains closed as the piston moves to the top and position 114. The exhaust steam 134 from the Toroidal Turbine Prime Mover is taken into the compressor system coil at 135. This coil 138 either encloses or is inside the exhaust stack to take up the exhaust heat that can be in the order of 1,500 degrees F. This raises the return steam pressure and temperature after which it is transferred to the larger coil around the compression cylinder at 139 where it expands with an endothermic reaction to help in controlling the temperature of this long compression cylinder. After moving through the coil 140 for this purpose its pressure is delivered through pipe 141 in direction 142 over the check valve 116 to the suction of the piston dropping from the 114 position that fills the cylinder with steam for the next explosive burst of gas combustion.

Figure 12:
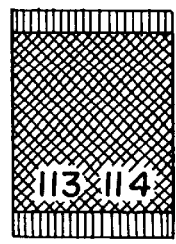
FIG. 12 is an enlarged view of the perforated piston form of this apparatus.

FIG. 12 A plane illustration of the perforated piston 113 and 114.

Figure 13:
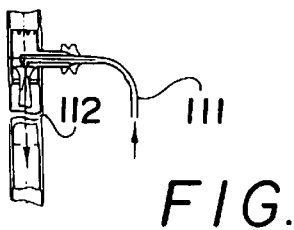
FIG. 13 is a cross-section enlargement of the attemperation unit of FIG. 11.

FIG. 13 An enlarged view of the standard attemperation unit 112 with the water pipe input at 111.

Figure 14:
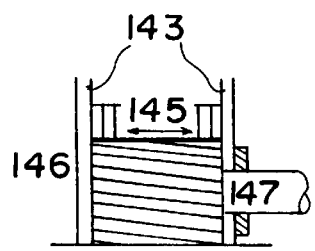
FIG. 14 is a cross-sectional view of the square spring section valving apparatus and the spring retention ring.

FIG. 14 A cut-away illustration of the square wire spring that is ground on all its surfaces with special tooling to fit when fully compressed with all the coils seated so it will serve to seal the port in the cylinder wall, together with the friction retention spring that delays the opening of the square compression spring after its full compression and because of its fit against the cylinder wall that is a result of gas explosion pressure momentarily applied. The square section spring 146 in the cylinder walls 143 and the friction retainer spring 145 set so the ground finished and fitted spring coils close the port 147.

Figure 15:
FIG. 15 is a sketch of a small boiler unit to supply the start-up steam for the compressor of FIG. 11.

FIG. 15 A small start-up boiler 137 for steam input to the compressor for the start of its operation with steam deliver 134 after which it is shut down. This can be compared to the compressed air unit used for the start-up of a diesel engine.

Figure 16:
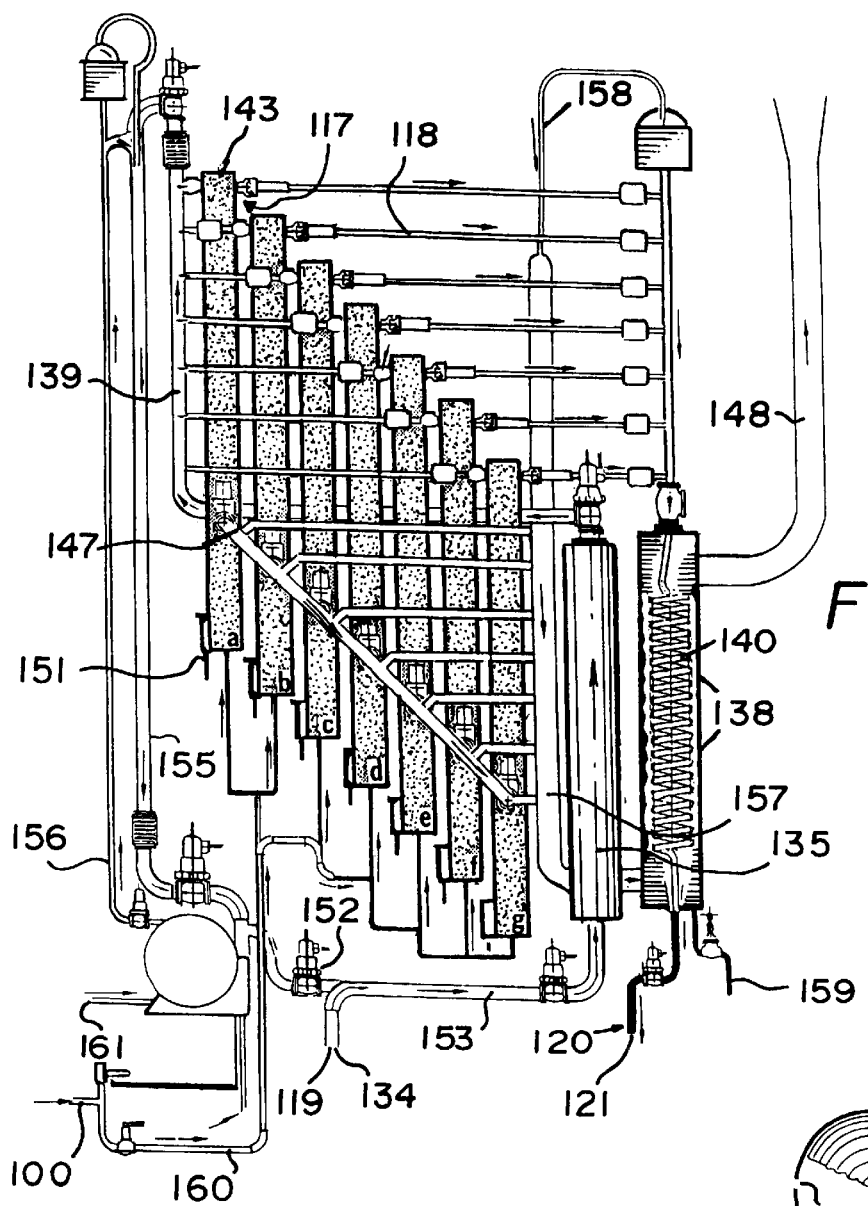
FIG. 16 A schematic illustration of a multiple steam compressor installation.

FIG. 16 This schematic sketch is an illustration showing the application of the steam compression system of FIG. 11 in connection with steam supply for the turbine of this invention. Here a small boiler 137 supplies startup and standby steam requirements at low pressure and temperature for this turbine. To achieve the steam volumes required a series of these compressor units work in synchronization. These are driven by natural gas as described earlier. The piping of this illustration shows the compressor units located typically in a series like 143. These are supplied from a gas main 100 delivered from line 160 to the ignition systems 151, a,b,c,d,e,f and g for the piston drives. Low pressure steam is delivered typically to the cylinder heads at 143 from steam riser 139 delivered from tank 135. This is the return steam from the turbine of FIG. 18. Compressed steam is typically taken off the cylinder heads at 143 through a series to a relief valve 117 and run along line 118 to a downcomer serving a coil 140 in a tank 138. Tank 138 also receives combustion exhaust gas from the combustion end of the cylinders 147 and passed as a group to an exhaust manifold 157 topped by steam pressure from line 158 metered to deliver a moderate downstream pressure to 157 aiding in driving gases to pass these over the heat exchange coil 140 in tank 138 to release through stack 148. This serves to extract heat from the 1,500° F. temperature of the natural gas combustion exhaust gases and provide additional heat to the compressed steam that subsequently is delivered to the turbine through line 120/121. Pipe 159 is a steam blowdown. A steam loop 156 is provided to service the compressor in startup and for makeup of steam loss. The steam return is 155. Input of this steam is supplied through the suction tank 135 that is normally supplied by a turbine as in FIG. 18 through line 119/134, but these can be by-passed by opening valve 152 to service the compressors with low temperature pressure steam from the boiler 137 and steam loop 156 through line 153 to tank 135 and manifold 139 that delivers through check valves to each of the compressors.

Figure 17:
FIG. 17 A cross-sectional illustration of the hollow ball or sphere that is used in the Toroidal Turbine that shows openings to relieve pressure and the thin Titanium wall.

FIG. 17 This sketch of the Titanium or Inconel alloy ball of the Toroidal Turbine 15 shows the thin wall at 144 and the venting ports at 149.

Figure 18:
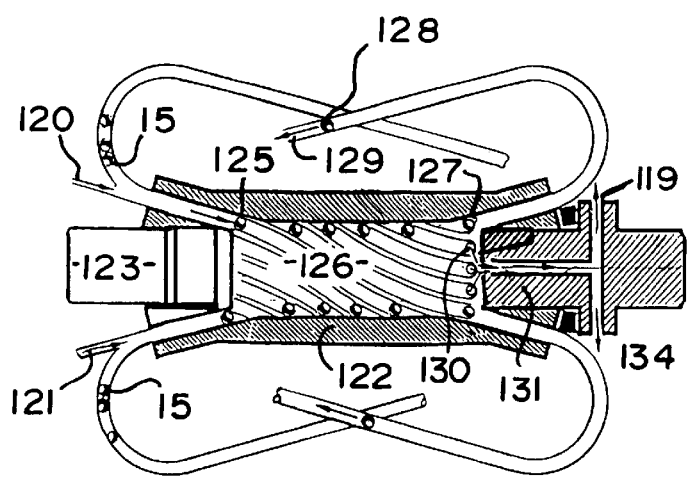
FIG. 18 A cross-sectional view of a gas compression apparatus that is associated with a method for compressing steam to drive a ball projectile Toroidal Turbine prime mover generally for electrical generation.

FIG. 18 This is a cross-sectional illustration of the Toroidal Turbine Prime Mover driven by the compressed steam of the apparatus described in FIG. 11. Here high pressure steam is delivered to a plurality of coils or a toroidal series of helix turns that open into and exit from a fixed stator that encloses grooved pathways that comprise two half-round grooves, one straight or optionally curved in the stator bore I.D. and the other curved oppositely on a closely fitted rotor shaft O.D. so the two coincide at an intersection to enclose and support a ball. This intersection moves to provide a channel for the ball as the ball causes rotation of the rotor. The ball, driven by compressed steam, enters this grooved pair at the intersection where the rotor and stator paths cross to provide a round opening for the ball's entrance. The ball is then driven along the stator groove and held in its course to force the curving rotor groove, enclosing the ball's other half, to turn as the ball rolls from one end of the stator and the rotor to the other. The toroidal path for the balls is one continuous circuit and the balls simultaneously arrive at the point where each single helix turn of the toroid enters the stator. Thirty stator and rotor passages provide for thirty balls driven across the stator and the rotor so the pressure applied is the sum of these. 500 psia on one ball is 15,000 psia on the lot causing the rotor to turn on its axis. Steam is exhausted from ports in the grooves at the rotor ends through a rotary seal and released for recompression. The stator is shown at 122 and the rotor at 123. Pressure is introduced continuously at 120 as applied to each helix input. 121 represents another input for another helix loop. A ball 15 at conduit position 125 is just entering the grooves and will progress across to 127 in a bending path to follow the stator groove. From there the ball 15 at conduit position 128 moves around the helical loop 129 to stack with other balls at the latch 36 for injection by ball impact into the steam stream to re-enter the stator at the next parallel groove 125 with its own discrete steam pressure input behind it. The ball stack and latch (not shown here) prevent steam backup. The grooves in the rotor are shown at 128 and the rotational direction at 124. The exhausted steam output moves through the ports at 130 to the shaft center bore at 131 and out through the shaft sides through a rotary seal to piping 132 and 133. The spent steam output of 130 moves through pipe 119 to input 134 to compressor exhaust stack preheater coil 140 of the steam compressor.

FIG. 19 A cross-sectional illustration of the piston of this invention shown in a position inside a cut-a-way cylinder 162 with the perforated piston surface that is a generic feature of the several different apparatus forms in which the piston is numbered variously as 3, 67,68,113,114 and 128. The perforations range in diameter from 0.020 inches to 0.075 inches and are prepared in a thin sheet metal stock inset into a cylindrical body 164 and 163. The ends of the piston 165 have a slight taper of 3 to 7 degrees that serves to provide a nozzle-like effect as the bubbles formed on the perforations stream off the trailing end as the piston moves. The laminar gap 167 between the piston and the cylinder walls 162 range from 4 to 10 one thousandths of an inch on a side.

FIG. 20 This is a cross-sectional illustration of the edge of the perforated sheet and the perforations 168. The cylinder wall is shown 162 and the gap or laminar space 167 is shown between this wall and the piston perforated surface 168. Supporting the perforated wrap of sheet metal is a fine thread cut 166 in the piston surface, the open thread spacing of which serves to allow a flow of steam of liquid to move around the piston's circumference and into the small ports uniformly. This threaded area is relieved longitudinally at intervals so porting from center opening into these reliefs can serve the perforations from the center of the piston.

FIG. 21 A three-dimensional view of a representative piston 128 in which the piston is mounted on a shaft 123. All of the pistons used in this procedure have a similar internal manifold arrangement. Steam or liquid is supplied from the piston end 169 and moves to a center bore 170 and beyond to lateral porting 171 and 172. This is followed by a second layer of porting 173 and 174 that is shown as a clear opening and is a longitudinal cut made across the threaded outer diameter support surface 166 of the piston that holds the layer of perforated sheet metal 168.

Figure 22:
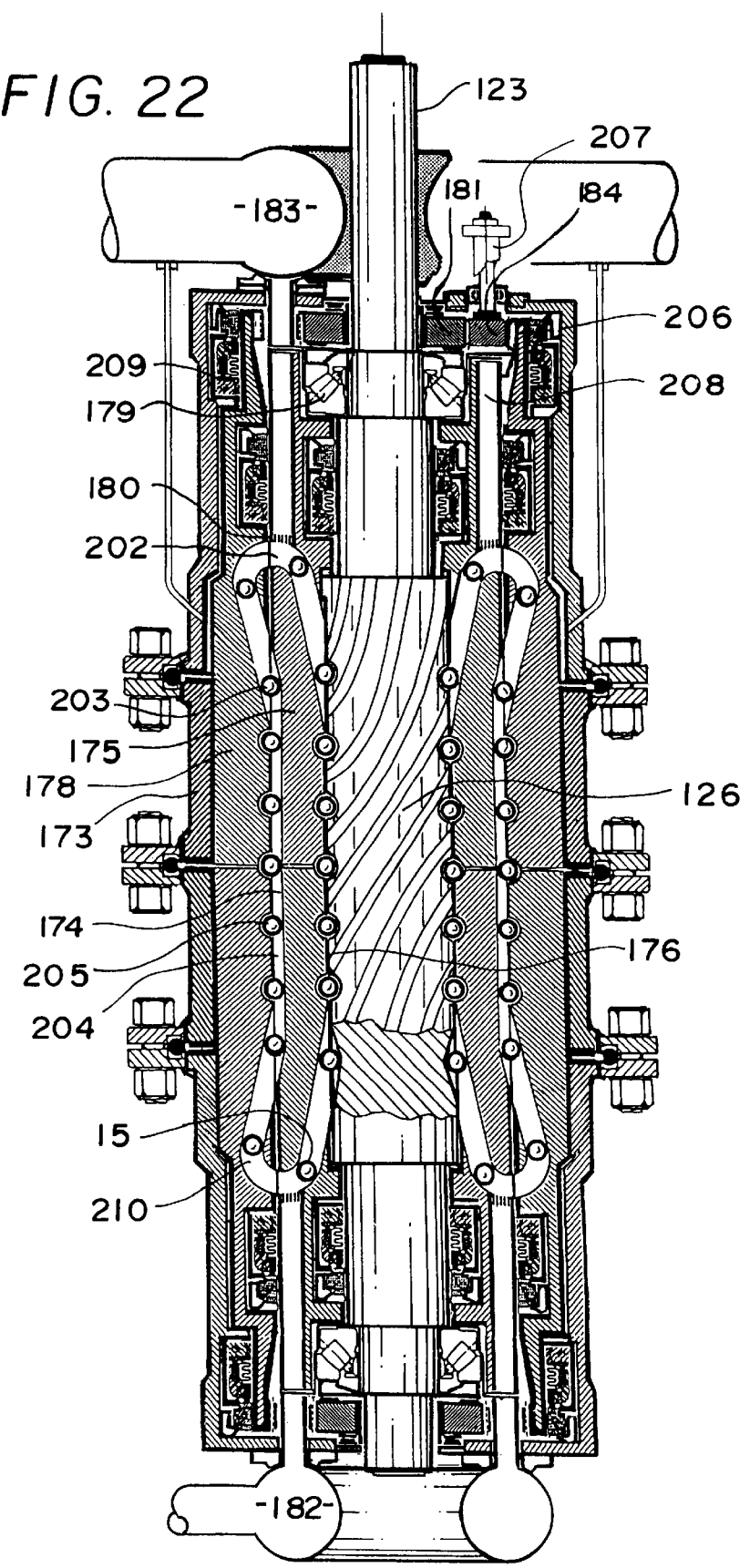
FIG. 22 Cross-sectional view of multiple rotor ball driven toroidal turbine form with gear driven ball return.

FIG. 22 A cross-sectional illustration of dual track system of the toroidal turbine in which a rotor 126 is supported on a shaft 123 in turn supported on bearings 179 inside a case 173 that also encloses one fixed member 175 encircling the rotor 126 and one counter-rotating shell member 178 enclosing the 175 shell. The shell 175 has grooves in both the inner and outer surface while the outer shell 178 has grooves only on the inner surface. The ball 15 is driven along the interfacing grooves 176 of rotor 126 and the inner surface of inner shell 175. In this illustration both grooves curve to oppose and provide the intersection engagement of the ball. As the ball completes its passage that causes the rotation of the rotor 126 as it exits this engagement at 202, it passes over a gas escape grating 180 so the driving pressure can exhaust to manifold 183. The ball then moves to the engagement at 203 between the shell members 175 and 178. Inner shell 175 is shown with a straight groove 204 in its outer wall and outer shell 178 with a curved groove 205. This is the return path of the ball that brings it back to the inlet or starting position. The straight groove in the outer wall of shell 175 can optionally be curved to provide a driving force of higher speed or provide other desirable variations. A planetary gear system 181 driven by the rotor shaft 123 turns fixed position idler gears 184 inside a follower ring gear 206 in a common gearing form. The idler gear 184 turns on a shaft 207 that is mounted on the end of the inner shell member 175 at 208 providing a rotation counter to that of the rotor. These shafts and the attachment of the shell 175 to the case 173 employs a mounting arrangement extending between the drive and the ring gears. This gearing arrangement provides a means to drive the return path of the balls in an opposite direction using any opposing groove angles that are appropriate so there is no dependence upon a portion of the gas exhaust or gravity for completion of the circuit to the starting point. Appropriate seals 209 are provided in all rotating members and the taper roller bearings 179 serve primarily as thrust elements on both ends of the supporting shaft 123. The point 210 is the location of "choke point" or stack up of balls as illustrated and detailed in FIG. 23 at 210 which is not shown in this drawing. This is essential in providing the sealing means of the ball's fit against the passage walls. The balls are blocked from reversing direction by the pressure applied to drive the nearby working ball 15 through the rotor and stator grooves. This reversal of direction is prevented by the tortuous curvature in the passage at this point 210 and the setting of the sprag pin adjustment 188.

FIGS. 23 to 26 Assembly drawings for the apparatus are shown here in sections 24—24, 25—25 and 26—26 to illustrate the detailed features of the rotor and stator in a unit comprising 16 rotor grooves external to the inside of the stator with 8 grooves internally. Cross-hatching lines have been omitted for clarity. The stator 122 is stationary and a part of the body. The rotor 126 turns in response to the drive of the representative ball 15. The rotor 126 is shown with a representative rotor groove 186. The stator groove is 196. The exhaust port is in the rotor 130 exiting through porting in the shaft 131. Pressure is introduced through the port 203 and moves against the ball 15 driving it past the choke point 210. A sprag set screw 188 provides adjustment restricting the ball passage in the turn at the choke point to prevent pressure backup. A gas release needle valve 195 adjusts for by-pass slip leakage. The ball 15 traverses the path between the grooves 186 and 196 to reach an exiting point 205 where it turns in a tube loop bend 193 to 194 after which it traces a return by gravity along path 189 to the stack-up at the choke point 210. The shaft 123 is supported in bearings at 190.

Figure 24:
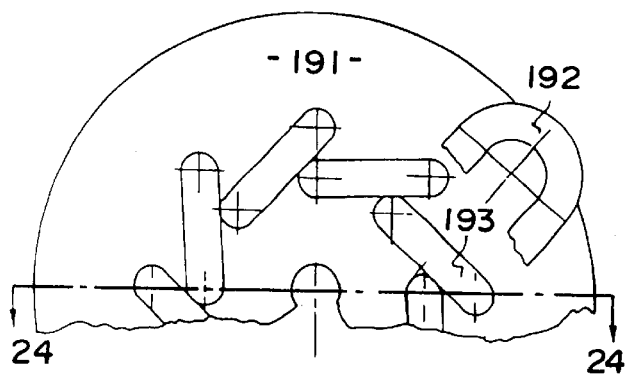
FIGS. 23 to 26 An assembly drawing of a rotor stator unit showing detail in fragmented sections to illustrate features of rotor stator grooving.
Figure 23:
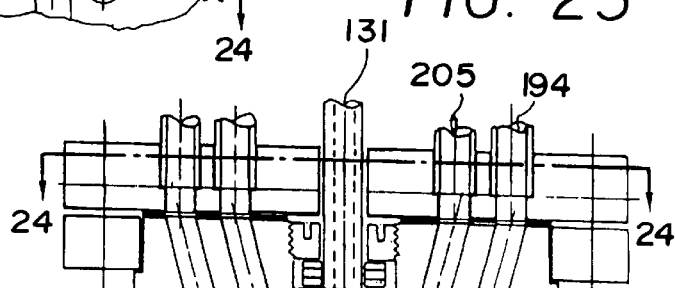

FIG. 24 A sectional view taken through the fragmented section line 24—24 of FIG. 23 showing a top view of that assembly 191 to illustrate the bent tube configuration 192 (as viewed from the side) providing the reversal of ball direction and the continuity of the circuit in a plurality of tube bends 193 serving the outlet 205 and the input 194 of FIG. 23.

Figure 25:
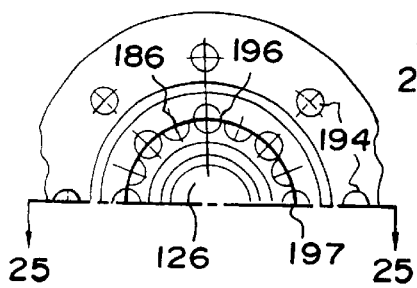

FIG. 25. This fragmented section 25—25 shows the grooves in the rotor 126 at 186 and the stator at 196 with the return path in the stator wall at 194. The gap between stator and rotor is shown 197.

Figure 26:
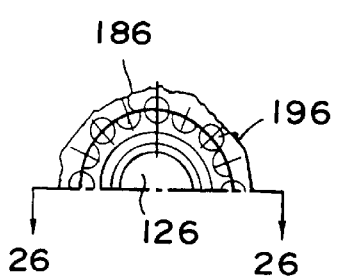

FIG. 26 A fragmented sectional view 26—26 shows the rotor 126 has an identical hole pattern on its opposite end that aligns with the rotor groove at 186 and the stator groove at 196. The curve of the rotor and the stator (if one is provided in the stator) occur in rotation with complete openings at each end of their respective lengths.

Figure 27:
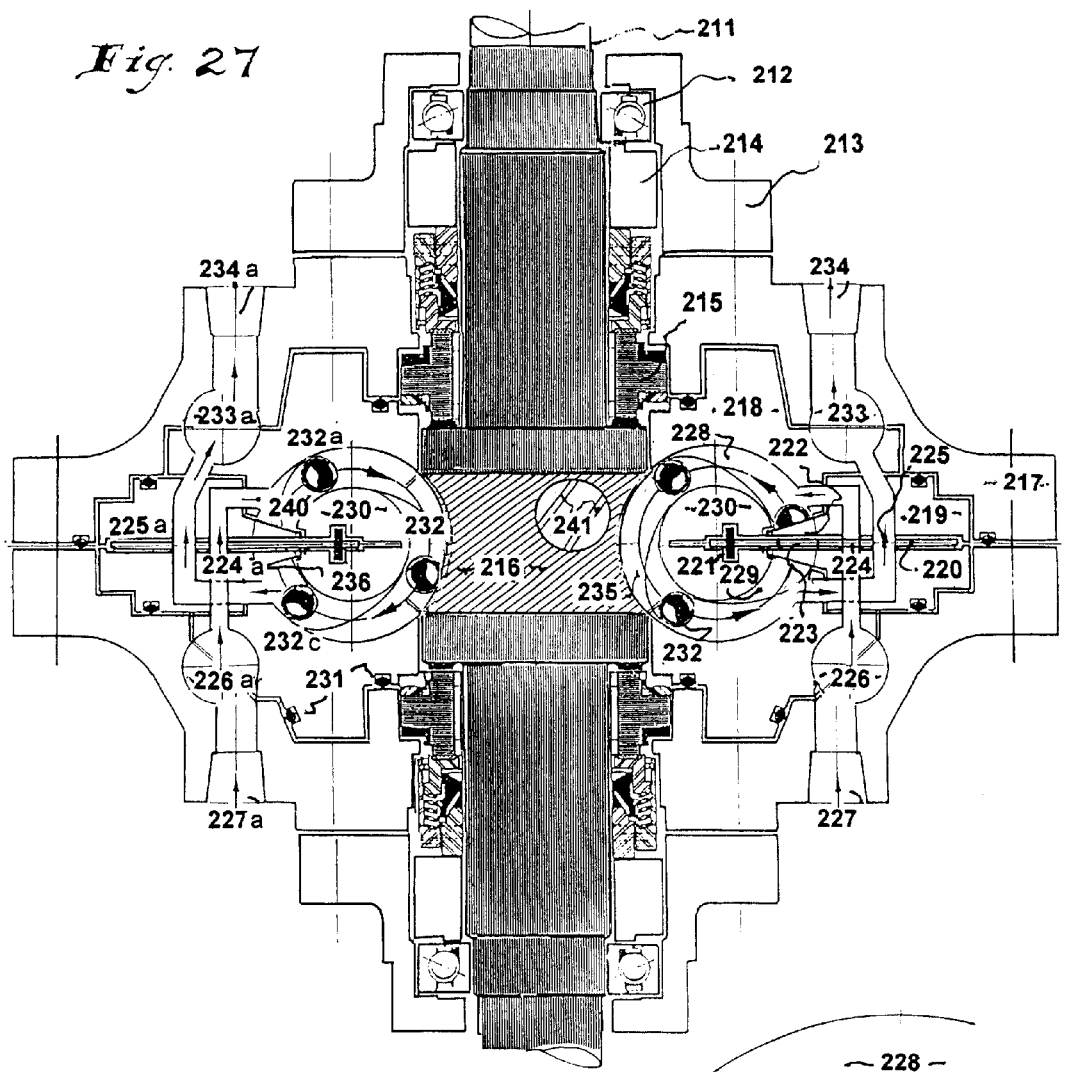
FIG. 27 is a cross-sectional view of a three-part Toroidal Turbine showing the multi-ball drive around a torus ring mounted in a stator body with a center elliptical hyperbolic rotor engaging the torus ring center.

FIG. 27 is a center-line fractional and cross-sectional view showing the apparatus of a toroidal turbine form comprising the grooved elliptical hyperbolic rotor shaft center 216, a torus ring with like grooves 230 surrounding the shaft and all enclosed within a grooved torus space in stator parts 218 and 219. The shaft is shown at 211, bearings location at 212, bearing spacer at 214, bearing cap 213, rotary seal at 215. Shaft spiral grooving at 216, stator case 217, stator midsection at 218, stator center and valve disc support at 219. The valve disc is shown at 220 extending from the fixed position in the torus ring 230 and pinned at 221. A static part of the stator center support 219 extends into a triangular cut widening the torus ring slot 237 so it can telescope over the disc 220 as it rotates in this space to provide a like ball passage hole in this stator extention, serving as a shutter to close the disc hole 223 in a timed interval when pressure is inserted between this closed barrier and the ball 232.

Pressure is inserted through port 223 into manifold 226 and is shown here as stopped by disc valving point 225. Another pressure input port 227a is shown receiving pressure that passes through pressure manifold 226a, the disc valve port 224a to drive ball 232a in grooved space 228a and 229a as pressure ahead of ball 232a drives ball 232b and accumulated pressure ahead of 232b drives ball 232c to finally pass out through disc valve 224a, manifold 233a and exhaust port 234a. The fluid pressure may be provided by a liquid or a gas or a mixture thereof.

Figure 28:
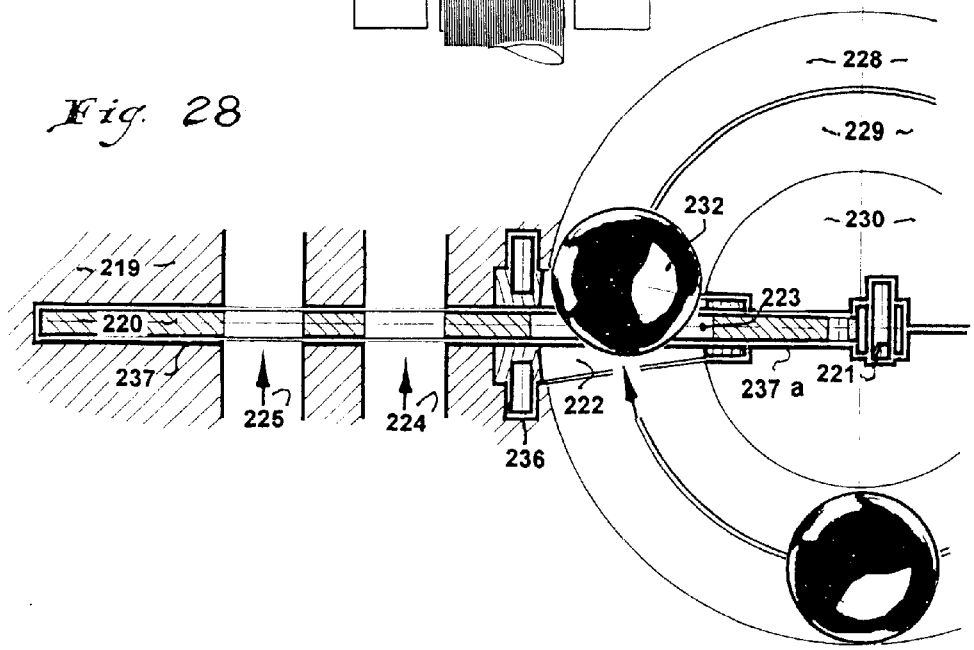
FIG. 28 is an enlarged fractional cross-sectional view of the torus ring control disc that serves to control the input of pressure and the exhaust while passing the balls at the groove intersections between the torus ring and the stator body.

FIG. 28 is a cross-sectional view of the position of the disc 220 as held in the torus body 230 with the pin 221. The stator body 219 is also grooved 237 to support the moving disc 220 with opening (shown open) for pressure input 224 and exhaust output valving point 225 control for the driving of ball 232 in the cross over point of helical grooves 228 of the stator and 229 of the torus ring. The ball 232 is shown passing through the dual opening of the stator extention part (not shown) and the opening in the disc 223.

Figure 29:
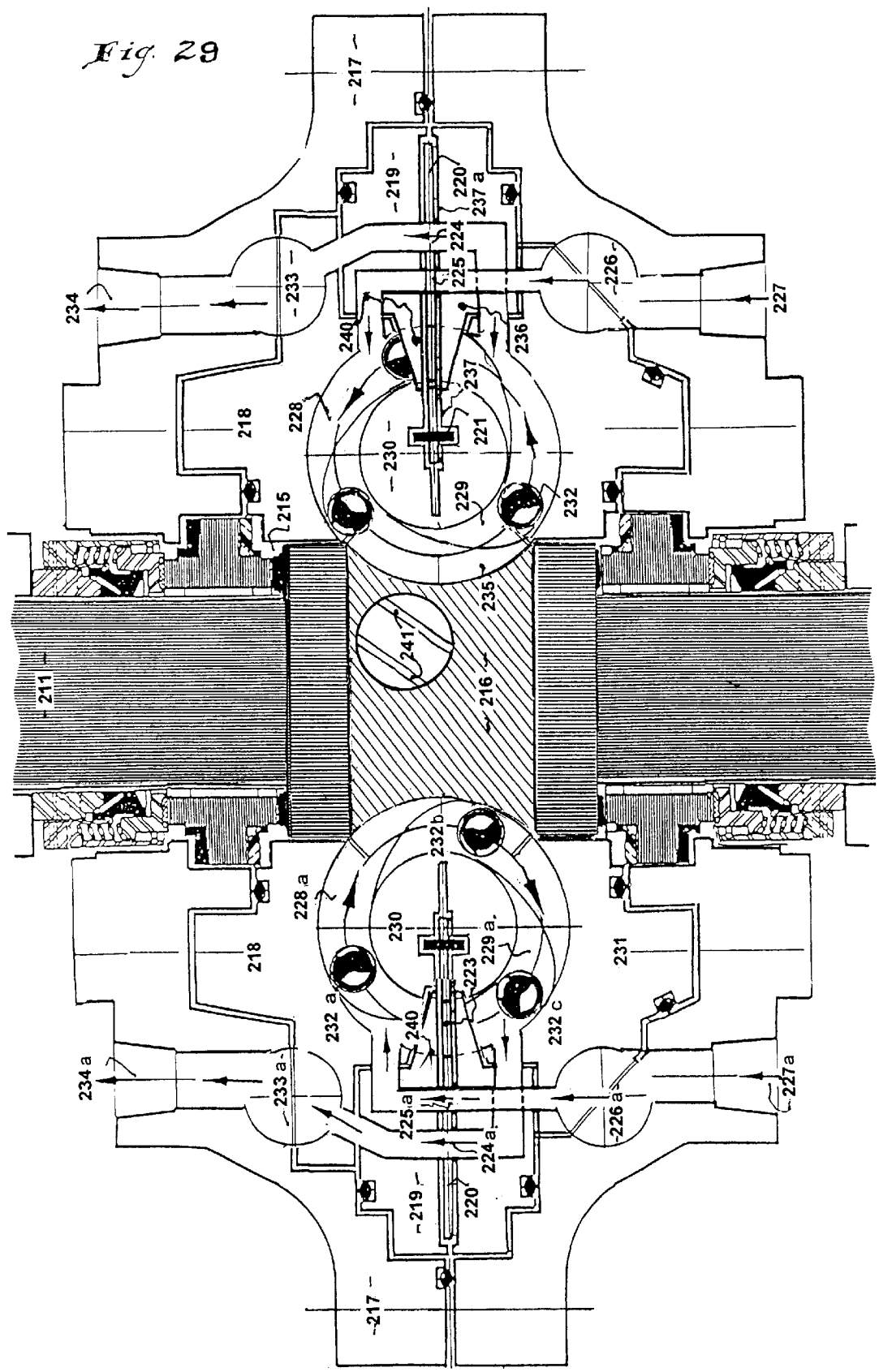
FIG. 29 is an enlarged fractional cross-section of the three-part Toroidal Turbine to facilitate the reading of numbering as shown in FIG. 27.

FIG. 29 is an enlarged view of a portion of FIG. 27 to provide more easily understood numbering. The numbers here are as described in FIG. 27.

Figure 30:
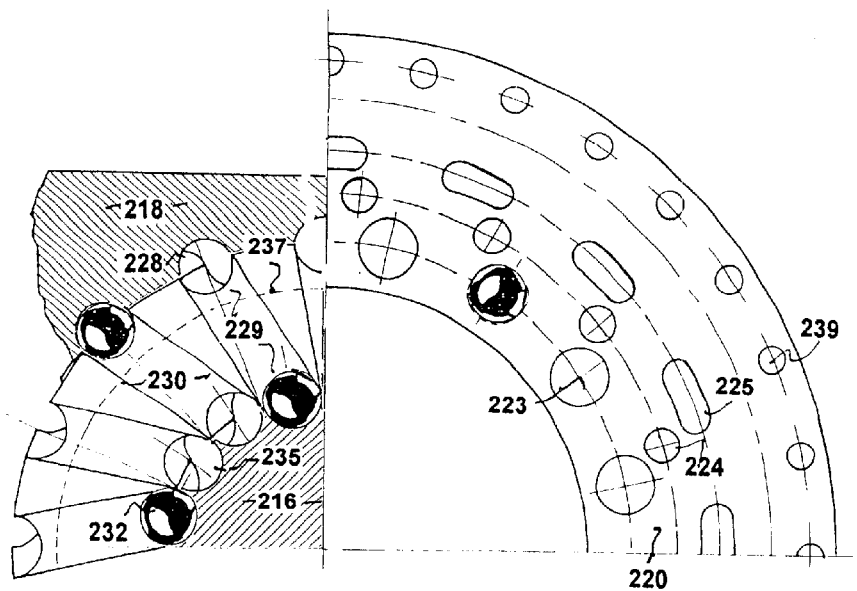
FIG. 30 is a plane view of the torus ring and the torus ring control disc in one quarter section.
Figure 31:
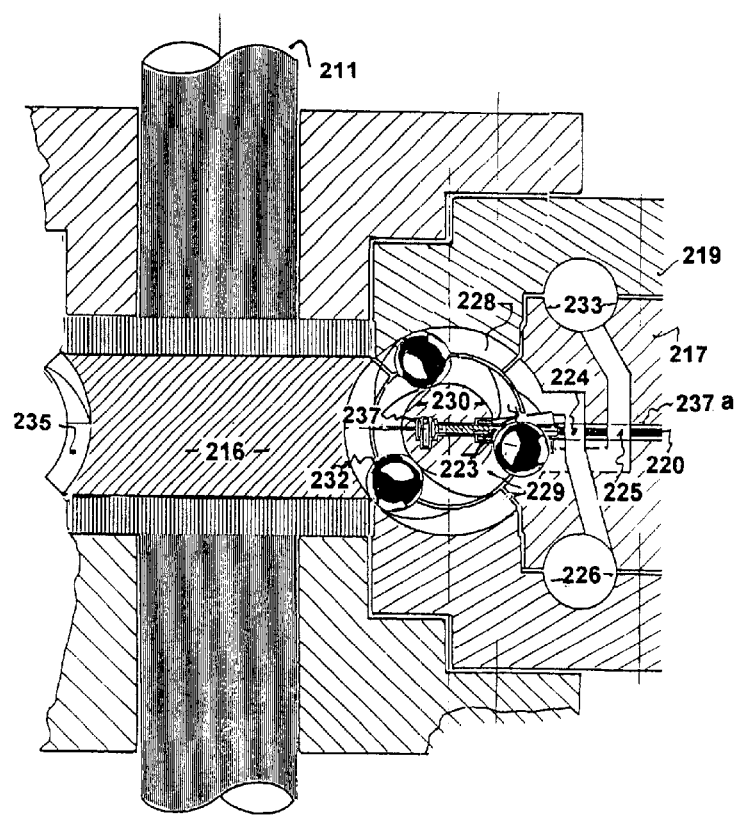
FIG. 31 is a simplified fractional cross-section of the three-part Toroidal Turbine basic method and apparatus elements.

FIG. 30 is an illustration of the torus ring 230 in cross-section showing the half-round grooves encircling its form in a toroidal-like continuous spiral path. The dotted line 237 represents a slot in the torus ring 230 into which the disk shown at 220 fits and is secured. The holes 223 in this disc 220 are equal in size to the two half-round grooves 229 of the torus ring and the half-round groove of the stator grooves 228. As shown in FIGS. 28 and 31, this arrangement permits the ball to pass through a hole 223 when the groove intersection retaining the ball 232 passes this point in the disc. Other openings 224 are for the input of fluid pressure and other openings 225 are for the output of fluid exhaust. Openings at 239 are usable as optional pilot control valving means. A hole 240 through opposing stator extensions 236 (FIG. 29) is closed by a solid portion of the disc 220 after the ball has passed through a disc hole 223.

FIG. 31 is a cross-sectional view of the Toroidal Turbine Method and apparatus elements of this invention comprising half-round grooves 235 in the surface of a rotor center part 216 of shaft 211, which passes through and closes the center of a torus ring 230. The grooved surface of the rotor center part 216 is preferably in the form of an elliptic hyperbolic. Torus ring 230 also has half-round grooves 229 and is housed in a corresponding space defined by half-round grooves 228 in an enclosing fixed stator 218. Opposing grooves have opposite or differing angles relative to each other and the lands bordering the grooves provide a close fit between all of these adjoining parts, such that the cooperating grooves almost seal the enclosed balls 232 at each crossing intersections of the opposing grooves. The torus ring 230 is slotted at 237 on its extreme peripheral edge to receive a holed disc 220, the holes 224 of which serve for valving the input of fluid pressure and the holes 225 serving to valve the output of exhaust fluid. Holes 223 serve to pass the balls at the groove intersections and at once the solid portions of the disc between these holes close this passage as a barrier permitting the pressure for driving the balls 232. The driven shaft is shown at 211, the elliptical hyperbolic rotor and its representative groove are shown respectively at 216 and 235, the balls at 232, the torus ring at 230, the stator case at 217, the pressure manifold at 226, and the exhaust manifold at 233. The stator mid-section is at 218 and the stator center section disc support 219 telescopes over the disc 220. An inward stator extension 236 extends radially into the torus ring 230 a sufficient depth to provide the opening and closure means associated with the ball passage as described above with reference to FIG. 29.

As a modification, the apparatus described above may be driven in the reverse direction with an electric motor to function as a pump and to in turn drive a second apparatus of like construction used normally as a prime mover liquid turbine. Thus, the Toroidal Turbine apparatus of the invention can be employed as a hydraulic driving system for a second Toroidal Turbine apparatus. The first apparatus comprises an electric or other power source used to drive the shaft of the first Turbine in reverse rotation to provide suction at what is normally the exhaust outlet and to thereby introduce hydraulic oil or other liquid to the ball passages where it is then pressurized. The balls as driven by the power source then move the oil through these passages to pressurize it and expel it from what is normally the pressure input port. This pressurized liquid is then used to drive a second Toroidal Turbine as described above, but functioning as a hydraulic motor.

What is claimed is:

1. A turbine apparatus comprising:
    a stator and a rotor mounted for rotation relative to the said stator, said stator having at least one stator groove and said rotor having at least one rotor groove;
    a toroidal ring mounted for rotation around the rotor between the rotor and the stator, and having at least one ring groove, a first portion of said ring groove facing said stator groove and a second portion of said ring groove facing said rotor groove, the direction of said first ring groove portion intersecting the direction of said stator groove to form a first channel segment and the direction of said second ring groove portion intersecting the direction of said rotor groove to form a second channel segment, and said first and second channel segments forming a continuous channel for receiving at least one ball; and
    a supply passage for supplying a propelling fluid to said channel for driving said ball along said channel to cause said torodial ring and said rotor to rotate relative to said stator.

2. A turbine apparatus according to claim 1 further comprising an exhaust passage for exhausting said propelling fluid from said continuous channel upon said ball completing a circuit of travel along said channel.

3. A turbine apparatus according to claim 2 further comprising at least one mechanical element arranged for movement to sequentially open and close said supply passage and said exhaust passage in response to rotation of said rotor.

4. A turbine apparatus according to claim 3, wherein said mechanical element comprises a disc carried by said toroidal ring and having solid portions for closing said passages when in alignment therewith and apertures for opening said passages when in alignment therewith.

5. A turbine apparatus according to claim 1, wherein each of said rotor grooves is straight and each of said ring grooves is curved to form at least a segment of a spiral.

6. A turbine apparatus according to claim 5, wherein said spiral segment is curved through an arc of 360° or less.

7. A turbine apparatus according to claim 6, wherein said rotor has a plurality of said rotor grooves and said ring has a plurality of said ring grooves, and wherein the spiral segment of each of said ring grooves is curved through an arc equal to 360° divided by the number of said ring grooves.

8. A turbine apparatus according to claim 1, wherein said propelling fluid is a gas.

9. A turbine apparatus according to claim 2, wherein said supply passage and said exhaust passage are each through a portion of said stator.

10. A turbine apparatus according to claim 1, wherein said rotor and said ring are mounted to rotate within said stator and wherein said supply and exhaust passages are external to said rotor.

11. A turbine apparatus according to claim 1, wherein at least a portion of said propelling fluid is returned from said exhaust passage to a source of said propelling fluid.

12. A turbine apparatus according to claim 1, wherein the direction of each of said ring grooves intersects the direction of a corresponding rotor groove at an angle in the range of 5° to 70°.

13. A turbine apparatus according to claim 1, wherein the direction of each of said ring grooves intersects the direction of a corresponding stator groove at an angle in the range of 5° to 70°.

14. A turbine apparatus according to claim 1, wherein the direction of each of said ring grooves intersects the direction of a corresponding stator groove at an angle in the range of 10° to 60°.

15. A turbine apparatus according to claim 1, wherein the direction of each of said ring grooves intersects the direction of a corresponding rotor groove at an angle in the range of 10° to 60°.

16. A turbine apparatus according to claim 1, wherein the toroidal ring is mounted for rotation inside a torus chamber within the stator, and the rotor is mounted for rotation within the toroidal ring;

wherein the toroidal ring, the stator and the rotor are all grooved with half-round spiral grooves with lands on each side, and the ring grooves spiral at a different angle from the opposing rotor grooves and the ring grooves spiral at a different angle from the opposing stator grooves; and wherein the lands of the ring grooves cooperate with the lands of the stator grooves and the lands of the ring grooves cooperate with the lands of the rotor grooves to create a plurality of round intersections between angled opposing grooves into which a plurality of the balls fit between the stator, the toroidal ring and the rotor.

* * * * *